United States Patent
Asai

(10) Patent No.: US 8,004,719 B2
(45) Date of Patent: Aug. 23, 2011

(54) THRESHOLD MATRIX GENERATION METHOD, THRESHOLD MATRIX GENERATING APPARATUS, AND RECORDING MEDIUM

(75) Inventor: Hiroshi Asai, Kyoto (JP)

(73) Assignee: Dainippon Screen MFG. Co., Ltd., Kyoto (JP)

( * ) Notice: Subject to any disclaimer, the term of this patent is extended or adjusted under 35 U.S.C. 154(b) by 761 days.

(21) Appl. No.: 12/068,582

(22) Filed: Feb. 8, 2008

(65) Prior Publication Data

US 2008/0192298 A1 Aug. 14, 2008

(30) Foreign Application Priority Data

Feb. 9, 2007 (JP) ................. P2007-30180

(51) Int. Cl.
*G06K 15/00* (2006.01)
*H04N 1/40* (2006.01)
(52) U.S. Cl. ...................... 358/3.13; 358/3.02
(58) Field of Classification Search ............. 358/1.9, 358/3.01, 3.02, 3.03, 3.06, 3.07, 3.1, 3.13, 358/3.14, 3.16, 3.3; 382/169, 172
See application file for complete search history.

(56) References Cited

U.S. PATENT DOCUMENTS

| 5,111,310 | A | 5/1992 | Parker et al. | |
|---|---|---|---|---|
| 5,526,438 | A | 6/1996 | Barton | |
| 5,685,652 | A | 11/1997 | Asai | |
| 6,172,773 | B1 | 1/2001 | Ulichney | |
| 7,477,422 | B2 * | 1/2009 | Konno et al. | 358/3.06 |
| 7,505,177 | B2 * | 3/2009 | Wechgeln et al. | 358/3.13 |
| 2002/0196469 | A1 * | 12/2002 | Yao | 358/3.06 |
| 2005/0195439 | A1 * | 9/2005 | Inoue et al. | 358/3.14 |
| 2007/0188777 | A1 * | 8/2007 | Kakutani | 358/1.9 |

FOREIGN PATENT DOCUMENTS

| EP | 0 606 992 A2 | 7/1994 |
|---|---|---|
| EP | 0 665 673 A2 | 8/1995 |
| EP | 0 762 734 A2 | 3/1997 |
| JP | 7-170400 | 7/1995 |
| JP | 8-184958 | 7/1996 |
| JP | 2622429 | 6/1997 |
| JP | 2000-141714 | 5/2000 |

(Continued)

OTHER PUBLICATIONS

European Search Report issued in European Patent Application No. EP 08001928.4-1522, dated May 28, 2008.

(Continued)

*Primary Examiner* — Gabriel I Garcia
(74) *Attorney, Agent, or Firm* — McDermott Will & Emery LLP

(57) ABSTRACT

A plurality of types of basic tiles are arranged in a matrix area while prohibiting an arrangement of only ON or OFF elements in two rows and two columns, to acquire an element matrix representing an arrangement of dots in a gray level of 50%. After one element is specified in each of a set of the ON elements and a set of the OFF elements, a process of specifying an element farthest from specified elements is repeated to acquire a turn-on order of dots with increase in gray level on a highlight side and a turn-off order of dots with decrease in gray level on a shadow side, and a threshold value of each element is determined in accordance with these orders. With this operation, it is possible to generate a threshold matrix which is capable of reducing graininess in an image generated by halftoning an original image.

30 Claims, 24 Drawing Sheets

FOREIGN PATENT DOCUMENTS

| | | |
|---|---|---|
| JP | 2004-015780 | 1/2004 |
| JP | 2005-001221 | 1/2005 |
| JP | 2006-165930 | 6/2006 |
| WO | WO 99/45697 | 9/1999 |

OTHER PUBLICATIONS

Japanese Office Action issued in Japanese Patent Application No. JP 2007-030180 dated Apr. 1, 2011.

* cited by examiner

F/G. 4

FIG. 16B
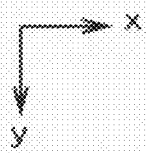
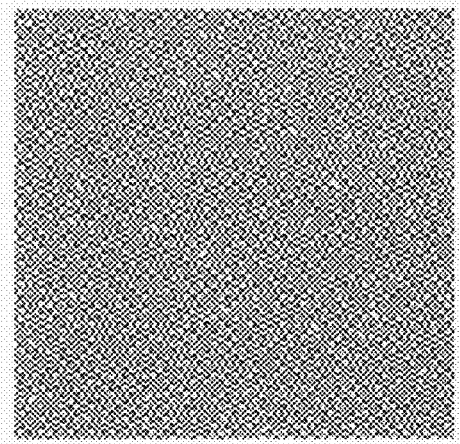
FIG. 17A
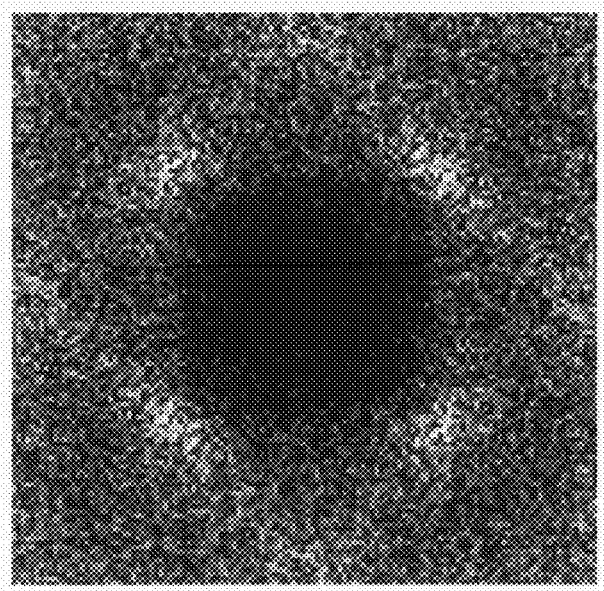

THRESHOLD MATRIX GENERATION METHOD, THRESHOLD MATRIX GENERATING APPARATUS, AND RECORDING MEDIUM

BACKGROUND OF THE INVENTION

1. Field of the Invention

The present invention relates to a threshold matrix which is compared with a grayscale original image in halftoning the original image, and also relates to a technique for generating the threshold matrix.

2. Description of the Background Art

Conventionally, an AM (Amplitude Modulated) screening where gray levels are represented by changing the size of dots which are regularly arranged, has been used in creating a halftone image for printing from an original image of gray scale (i.e., continuous tone). An FM (Frequency Modulated) screening where gray levels are represented by changing the number of dots of certain size, the dots being irregularly arranged, has been used for the original image in which moire easily arises. The FM screening is specifically used in an inkjet printer in many cases.

In halftoning the original image, a threshold matrix which is compared with the original image is generated and prepared. As a technique for generating the threshold matrix, for example, Japanese Patent Application Laid-Open No. 8-184958 (Document 1) discloses a technique where a plurality of types of basic tiles each of which is an arrangement of two black dots and two white dots in tow rows and two columns are arranged in a threshold matrix area while prohibiting the basic tiles from forming a predetermined prohibited arrangement, to acquire an array of black dots and white dots in a gray level of 50%, and values of 0 and 1 are respectively assigned to the two black dots of each basic tile and values of 2 and 3 are respectively assigned to the two white dots in each basic tile. Then, the threshold matrix area is divided into four divided areas to which values of 0 to 3 are respectively assigned, and a process of further dividing each divided area into four divided areas while assigning values of 0 to 3 to the four divided areas is repeated, to thereby determine a threshold value of each position in the threshold matrix area. In a technique disclosed in Japanese Patent Gazette No. 2622429 (Document 2), an image is generated by applying a blue noise filter to a binary dot profile representing an arrangement of dots in a gray level and a position where a dot should be added in the dot profile is specified on the basis of a gray level of each pixel in a differential image between the image and the original dot profile, to generate a dot profile in the next gray level of the above gray level. This process is repeated to acquire a dot profile in each gray level and thereby, a blue noise mask (threshold matrix) is generated.

Japanese Patent Application Laid-Open No. 7-170400 discloses a technique where all of the OFF pixels are identified as candidate pixels in a matrix which is in an initial state corresponding to the lowest tone level, a cost value for each candidate pixel based on a radial distance and a relative angle between the candidate pixel and each ON pixel is obtained, and a candidate pixel whose cost value is minimum is made ON, to thereby generate a dither matrix (threshold matrix).

In the meantime, to reduce graininess (reduce granularity) is required in the halftone image which is generated by halftoning the original image. In the technique of Document 1, since it is prohibited only black dots or white dots are arranged in an area of two rows and two columns in an arrangement of the basic tiles, it is possible to reduce graininess in a halftone image corresponding to a gray level of 50%, however, there is a possibility that graininess appears in a halftone image corresponding to another gray level (specifically, a gray level away from 50%). In the technique of Document 2, there is a case where granularity occurs in a halftone image, depending on a distribution in a white noise pattern which is given as the initial condition in generation of the dot profile in a gray level of 50% which is the initial dot profile. Further, since a distance between dots is not considered in generation of the dot profile representing an arrangement of dots in each gray level, it is thought that graininess becomes larger in a gray level away from 50%.

SUMMARY OF THE INVENTION

The present invention is intended for a threshold matrix generation method of generating a threshold matrix which is compared with a grayscale original image in halftoning the original image. It is an object of the present invention to reduce graininess in a halftone image generated by halftoning the original image.

The threshold matrix generation method according to the present invention comprises the steps of: a) preparing a plurality of types of basic tiles each of which is an arrangement of elements in two rows and two columns consisting of two ON elements each representing existence of a dot and two OFF elements each representing absence of a dot, and arranging a plurality of basic tiles each of which is one of the plurality of types of basic tiles, in a matrix area where a threshold matrix is generated, in accordance with a prohibition condition for at least prohibiting an arrangement of only ON elements or OFF elements in an area of two rows and two columns, to acquire an element matrix representing an arrangement of dots in a gray level of 50%; b) setting a dot at arbitrary one element on a highlight dot pattern which is a set of ON elements in the element matrix; c) repeating a process of adding a new dot to an element on the highlight dot pattern, the new dot being farthest from existing dots on the highlight dot pattern, on the premise of spatial repetition of the threshold matrix in halftoning of an original image, or repeating the process in accordance with a predetermined condition, to determine a turn-on order in which dots are added to elements in accordance with increase in gray level on a highlight side; d) setting dots at all elements excluding arbitrary one element on a shadow dot pattern which is a set of OFF elements in the element matrix; e) repeating a process of removing a dot of an element on the shadow dot pattern, the dot being farthest from elements in each of which a dot is not set on the shadow dot pattern, on the premise of spatial repetition of the threshold matrix, to determine a turn-off order in which dots are removed from elements in accordance with decrease in gray level on a shadow side; and f) determining a threshold value of each element in the matrix area in accordance with the turn-on order and the turn-off order.

According to the present invention, it is possible to reduce graininess in a halftone image generated by halftoning the original image.

According to a preferred embodiment of the present invention, the step a) comprises the steps of: a1) setting a basic tile of one type at arbitrary one tile position in the matrix area; a2) setting a new basic tile of one type at a tile position which is farthest from basic tiles of one type in accordance with the prohibition condition, on the premise of spatial repetition of the threshold matrix; and a3) repeating the step a2) by a predetermined number of times. With this operation, it is possible to suppress appearance of singular points in the halftone image. In this case, more preferably, the number of elements in at least one of a row direction and a column direction in the element matrix is a value which is different from a power of two. It is thereby possible to prevent the basic tiles of one type from being regularly arranged in the element matrix representing an arrangement of dots in a gray level of 50%. As a result, it is possible to suppress occurrence of moire in the halftone image, caused by interference between the original image and the threshold matrix.

According to another preferred embodiment of the present invention, the matrix area corresponds to one color component, and the steps a) to f) are performed in a matrix area of another color component which is different from the matrix area of one color component, to generate a threshold matrix of another color component which has a different size from a threshold matrix of one color component. This makes it possible to suppress occurrence of moire caused by interference of halftone images of a plurality of color components.

According to an aspect of the present invention, the plurality of types of basic tiles are two types of arrangements in each of which the two ON elements are arranged diagonally. It is thereby possible to further reduce graininess in the halftone image.

According to another aspect of the present invention, the two ON elements are arranged in a row direction or a column direction in each of the plurality of types of basic tiles. This makes it possible to print the halftone image with high reproduction.

The present invention is also intended for a threshold matrix generating apparatus for generating a threshold matrix which is compared with a grayscale original image in halftoning the original image, and still also intended for an electronic apparatus-readable recording medium in which data of a threshold matrix is recorded, the threshold matrix being compared with a grayscale original image in halftoning the original image.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 16A and 16B are views each showing a halftone image;
FIGS. 17A and 17B are views each showing a characteristic of spatial frequency of the halftone image.

DESCRIPTION OF THE PREFERRED EMBODIMENTS

Figure 1:
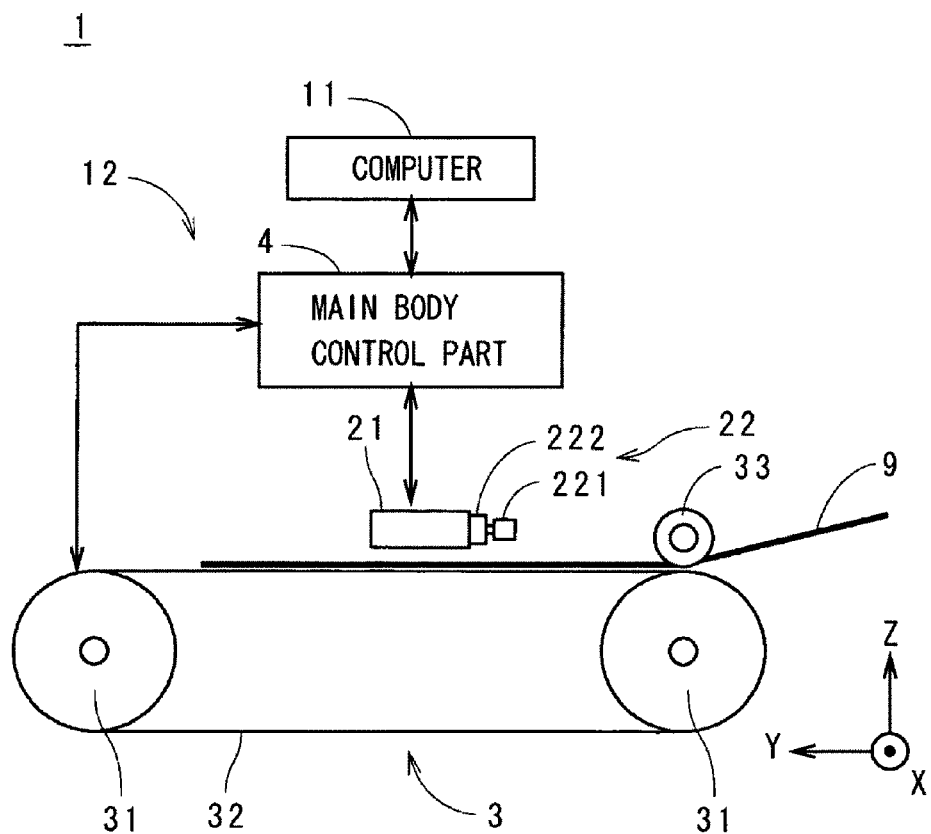
FIG. 1 is a view showing a constitution of a printer.

FIG. 1 is a view showing a construction of an inkjet printer 1 in accordance with the first preferred embodiment of the present invention. The printer 1 is an image recording apparatus for recording images of a plurality of color components on a printing paper 9 where the images are overlapped on the printing paper 9. A main body 12 of the printer 1 has a head 21 for ejecting fine droplets of ink onto the printing paper 9, a head moving mechanism 22 for moving the head 21 in the X direction of FIG. 1 along the printing paper 9, a feeder 3 for moving the printing paper 9 toward the Y direction perpendicular to the X direction under the head 21, and a main body control part 4 which is connected to the head 21, the head moving mechanism 22, and the feeder 3. A computer 11, which has a CPU for performing various computations, a memory for storing various information and the like, is connected to the main body control part 4. In the printer 1, the main body 12 receives a signal from the computer 11 and prints a color halftone image (halftone dot image) on the printing paper 9. An object to be printed in the printer 1 may be a film or the like other than the printing paper 9.

The feeder 3 has two belt rollers 31 connected to a not-shown motor and a belt 32 hanging between the two belt rollers 31. The printing paper 9 is guided onto the belt 32 through a roller 33 positioned above the belt roller 31 on the (−Y) side to be held thereon and moves toward the (+Y) side together with the belt 32, passing under the head 21.

The head moving mechanism 22 is provided with a loop-like timing belt 222 which is long in the X direction, and a motor 221 reciprocally moves the timing belt 222 to thereby smoothly moves the head 21 in the X direction corresponding to the width of the printing paper 9.

Figure 2:
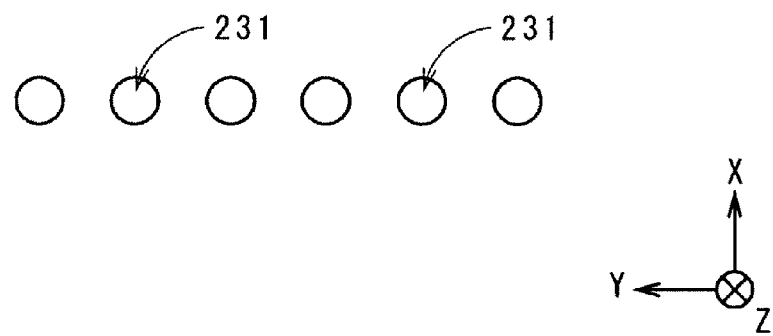
FIG. 2 is a view showing a plurality of outlets.

The head 21 has a plurality of modules arranged in the X direction and each module can eject ink of one of a plurality of colors. As shown in FIG. 2, a plurality of outlets 231 each of which ejects droplets of ink onto the printing paper 9 (toward the (−Z) direction in FIG. 1) are provided in each module, and the plurality of outlets 231 are arranged at a regular pitch toward the Y direction in a plane parallel to the printing paper 9 (the plane parallel to the XY plane). While printing is not performed in the printer 1, the head moving mechanism 22 disposes the head 21 at a predetermined home position and the plurality of outlets 231 are closed with lib members at the home position, to prevent the outlets 231 from being blocked by drying of the ink in the vicinities of the outlets. Though the head 21 ejects ink of black, cyan, magenta, and yellow in the preferred embodiment for convenience of description, ink of other color components such as light cyan may be ejected in the printer 1.

In the actual printing, the head 21 moves toward the (+X) direction while ejecting ink, and after the head 21 reaches on the (+X) side of the printing paper 9, the printing paper 9 moves on the (+Y) side by a predetermined distance. Then, the head 21 moves toward the (−X) direction while ejecting ink, and after the head 21 reaches on the (−X) side of the printing paper 9, the printing paper 9 moves on the (+Y) side. Thus, in the printer 1, the head 21 performs main scanning relatively to the printing paper 9 in the X direction and performs sub scanning relatively to the printing paper 9 in the Y direction every time when the main scanning is finished.

Figure 3:
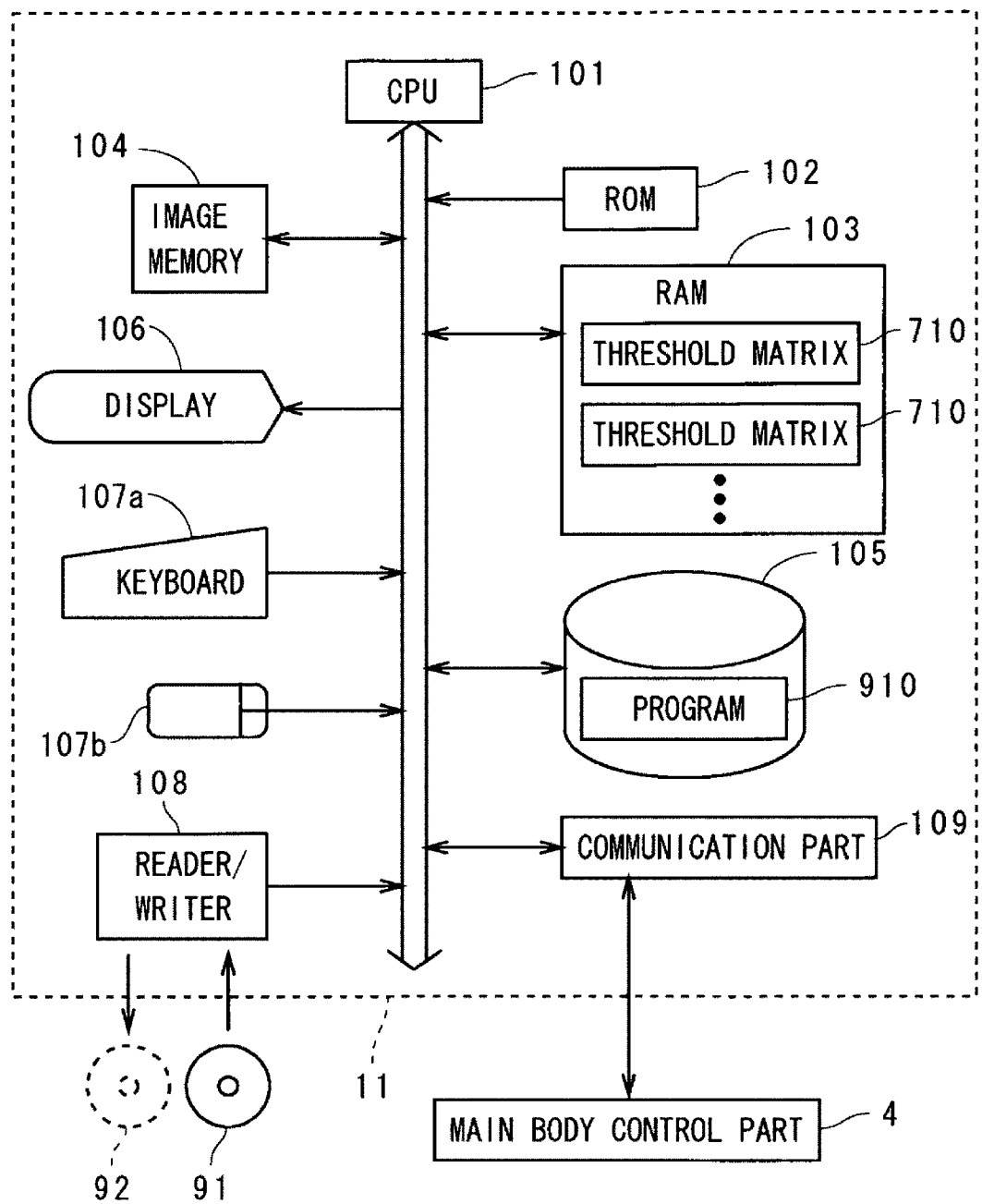
FIG. 3 is a view showing a structure of a computer.

As shown in FIG. 3, the computer 11 has a structure of general computer system where a CPU 101 for performing various computations, a ROM 102 for storing a basic program and a RAM 103 for storing various information are connected to a bus line. To the bus line, an image memory 104 for storing data of a color image (that is to say, each pixel in the image has pixel values of the plurality of color components and hereinafter, the image is referred to as an "original image") to be represented by halftoning (halftone dots), a fixed disk 105 for storing information, a display 106 for displaying various information, a keyboard 107*a* and a mouse 107*b* for receiving an input from an operator, a reader/writer 108 which reads information from a computer-readable recording medium 91 such as an optical disk, a magnetic disk or a magneto-optic disk and writes information into the recording medium 91, and a communication part 109 for making communications with the main body control part 4 are further connected through interfaces (I/F) as appropriate.

In the computer 11, a program 910 is read out from the recording medium 91 through the reader/writer 108 in advance and stored in the fixed disk 105. The program 910 is copied in the RAM 103, the CPU 101 performs a computation according to the program 910 in the RAM 103 (that is, the computer 11 executes the program), and the computer 11 thereby operates as a threshold matrix generating apparatus for generating a later-discussed threshold matrix (SPM (Screen Pattern Memory) data) 710 for each color component used in halftoning of the original image. The threshold matrixes 710 and the data of the color original image stored in the image memory 104 are transmitted to the main body control part 4 through the communication part 109.

Figure 4:
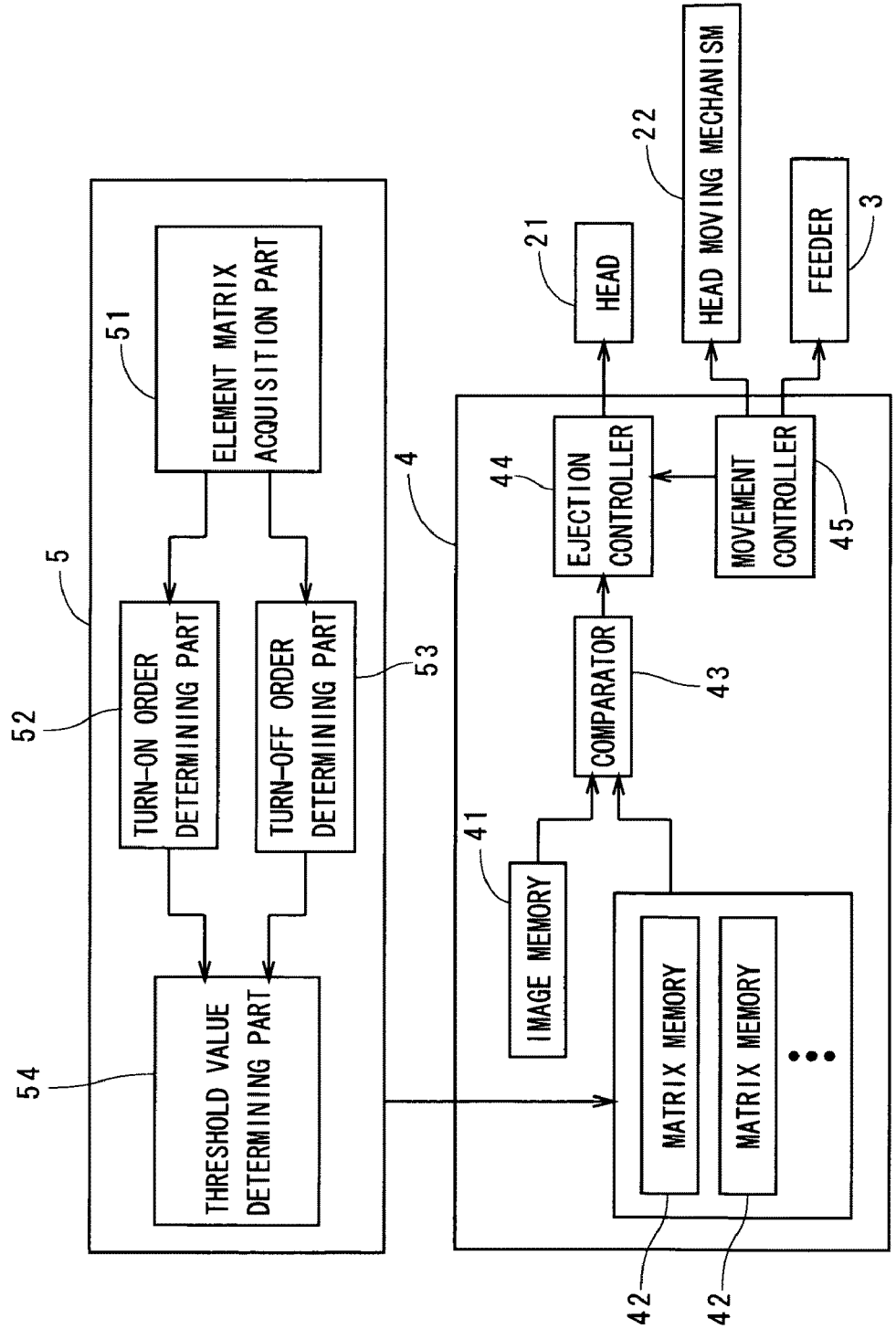
FIG. 4 is a block diagram showing a functional constitution of the printer.

FIG. 4 is a block diagram showing a functional constitution of the printer 1. Functions of an element matrix acquisition part 51, a turn-on order determining part 52, a turn-off order determining part 53, and a threshold value determining part 54 in an operation part 5 of FIG. 4 are achieved by the computer 11. The main body control part 4 has an image memory 41 for storing the data of the color original image, a plurality of matrix memories 42 (SPM (Screen Pattern Memories)) for respectively storing the threshold matrixes 710 of the plurality of color components generated in the operation part 5, a comparator 43 (halftoning circuit) for comparing the original image with the threshold matrix 710 for each color component, a movement controller 45 for controlling relative movement of the head 21 to the printing paper 9, and an ejection controller 44 for controlling ejection of ink from the plurality of outlets 231 of the head 21 in synchronization with the relative movement of the head 21.

Next discussion will be made on an operation for printing an image in the printer 1. When the printer 1 prints an image on the printing paper 9, the threshold matrix 710 is generated for each color component in advance through a threshold matrix generation process which is discussed later, and the threshold matrixes 710 are stored in the matrix memories 42 of FIG. 4.

Figure 5:
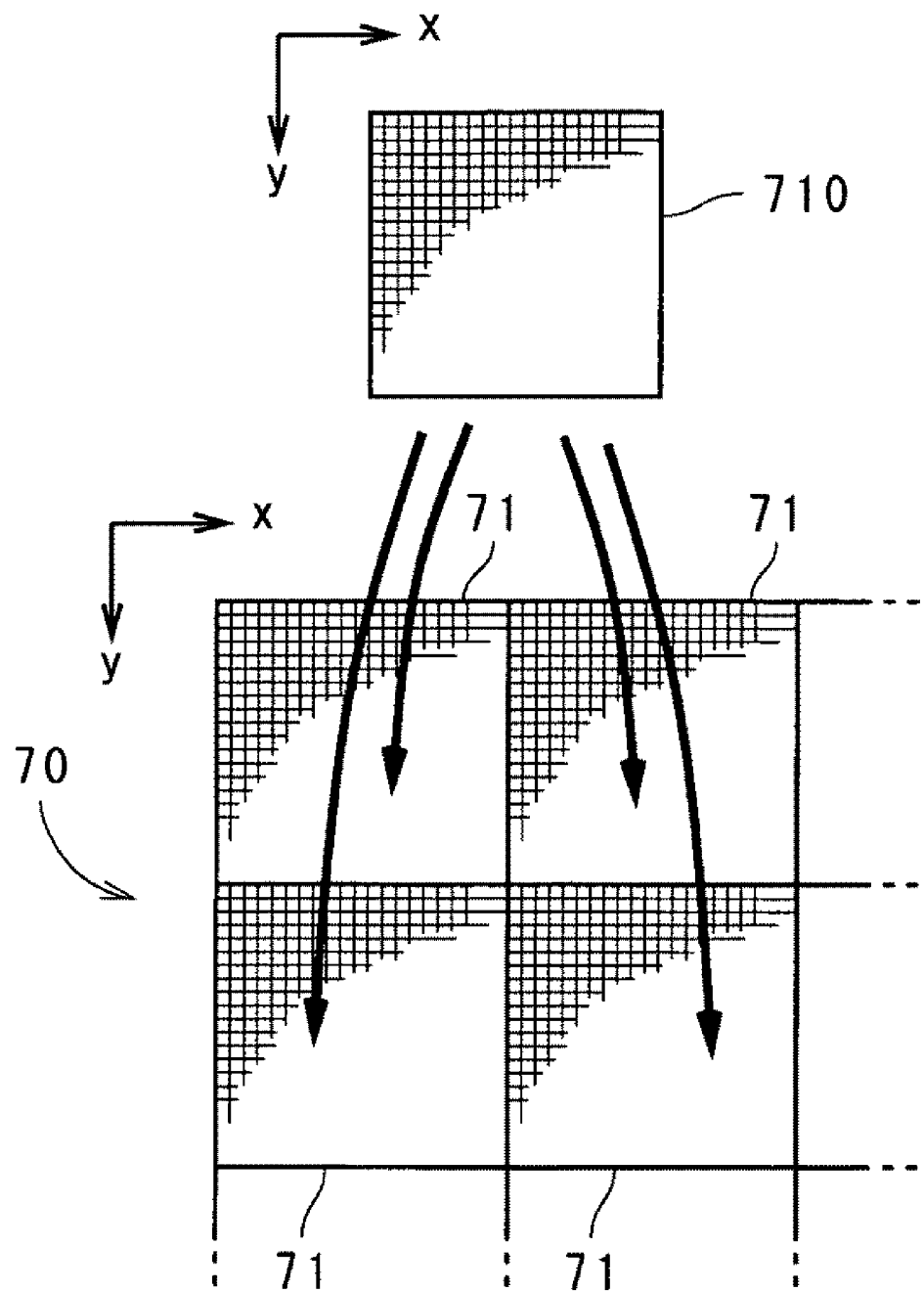
FIG. 5 is a view abstractly showing an original image and a threshold matrix.

In the printer 1, first, the color original image is inputted to the image memory 41 of the main body control part 4 from the computer 11 and stored therein. FIG. 5 is a view abstractly showing the original image 70 and the threshold matrix 710. In each of the original image 70 and the threshold matrix 710, a plurality of pixels or a plurality of elements are arranged in a row direction corresponding to the main scan direction (the row direction is shown as the x direction in FIG. 5) and a column direction corresponding to the sub scan direction (the column direction is shown as the y direction in FIG. 5). In the following description, the original image is represented at gray levels of 0 to 255 in each color component, in all the respects other than specifically indicated.

After the original image 70 is stored in the image memory 41, the original image 70 is compared with the threshold matrix 710 for each color component to generate a color halftone image representing the original image 70 (actually, the color halftone image is an image represented by the FM screen). Here, halftoning of the original image 70 is discussed. In halftoning of the original image 70, as shown in FIG. 5, the original image 70 is divided into a large number of areas having the fixed size and repeat areas 71 each of which serving as a unit in halftoning are set. Each matrix memory 42 has a memory area corresponding to one repeat area 71 and a threshold value is set to each address (coordinates) of the memory area to store the threshold matrix 710. Conceptually, each repeat area 71 of the original image 70 and the threshold matrix 710 for each color component are superposed and a pixel value of the color component of each pixel in the repeat area 71 is compared with a threshold value in the threshold matrix 710 corresponding to the pixel value, to thereby determine whether or not writing (formation of a dot of the color) should be performed on the position of the pixel on the printing paper 9.

Actually, a pixel value of one pixel in the original image 70 is read out with respect to each color component from the image memory 41, on the basis of an address signal outputted from an address generator of the comparator 43 in FIG. 4. An address signal representing a position in the repeat area 71 corresponding to the pixel in the original image 70 is also generated in the address generator, one threshold value in the threshold matrix 710 of each color component is specified and read out from the matrix memory 42. The pixel value from the image memory 41 and the threshold value from the matrix memory 42 are compared for each color component in the comparator 43, to determine a pixel value of the position (address) of the pixel in a binary outputted image of each color component. Therefore, looking at one color component, in the grayscale original image 70 shown in FIG. 5, for example, a pixel value "1" is assigned (i.e., a dot is set) at each position where a pixel value is larger than the threshold values of the threshold matrix 710 corresponding to the pixel value, and a pixel value "0" is assigned (i.e., a dot is not set) at each of remaining pixels, to generate the binary outputted image as the halftone image of the above color component.

In the printer 1 of FIG. 1, when a portion of the halftone image (for example, the portion corresponding to a plurality of repeat areas 71 at the end on the (+y) side which is first printed is generated for each color, main scanning of the head 21 and intermittent sub scanning of the head 21 are started by the head moving mechanism 22 and the feeder 3 which are driven by the movement controller 45 and in parallel with the above process of halftoning (generation process of the halftone image), ejection of ink from the plurality of outlets 231 included in each module 23 of the head 21 is controlled by the ejection controller 44 in synchronization with relative movement of the head 21 to the printing paper 9.

Since the halftone image is printed on the printing paper 9, the plurality of pixels in the halftone image are considered to be arranged on the printing paper 9. In the ejection controller 44, in synchronization with relative movement of the head 21 to the printing paper 9, when a pixel value in the halftone image corresponding to an ejection position of each outlet 231 on the printing paper 9 is "1", a dot is formed on the ejection position, and when the pixel value in the halftone image is "0", a dot is not formed on the ejection position. In this way, with respect to each component of black, cyan, magenta, and yellow, ejection of ink from the plurality of outlets 231 is controlled in accordance with comparison results between the pixel values of the original image 70 at the ejection positions of the plurality of outlets 231 relative to the printing paper 9 and the threshold values of the threshold matrix 710 corresponding to the pixel values, while moving the plurality of ejection positions on the printing paper 9, which individually correspond to the plurality of outlets 231, relatively to the printing paper 9.

Actually, in the printer 1, a plurality of dots which are (virtually) formed with one main scanning by each outlet 231 and arranged in the main scan direction in a line are treated as a dot group, and interlace printing is performed where another main scanning of the head 21 interpolates between adjacent dot groups in a plurality of dot groups arranged in the sub scan direction. In a case where the plurality of outlets 231 are densely arranged in the sub scan direction in the head 21, the interlace printing does not necessarily have to be performed.

In the printer 1, operations for recording halftone images of black, cyan, magenta and yellow on the printing paper 9 while generating the halftone images, are performed in parallel, and a color halftone image representing the color original image is printed on the printing paper 9. After the whole halftone image is printed on the printing paper 9, relative movement of the head 21 to the printing paper 9 is stopped to complete the printing operation in the printer 1.

Next discussion will be made on a generation process of a threshold matrix used in the printer 1 with reference to FIGS. 6A and 6B. Generation of a threshold matrix of one color is explained first and thereafter, generation of threshold matrixes of the other colors is explained.

In the element matrix acquisition part 51 of the operation part 5, first, a matrix area which stores a threshold matrix of one color and is defined in the row direction corresponding to the main scan direction and the column direction corresponding to the sub scan direction, is set and basic tiles arranged in the matrix area are prepared (Step S11).

Figure 7A:
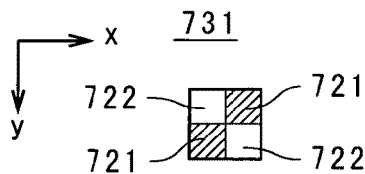
FIGS. 7A and 7B are views each showing a basic tile.
Figure 7B:
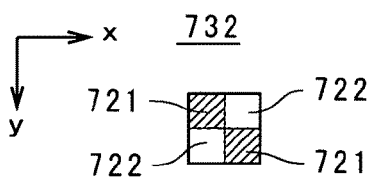

FIG. 7A and 7B are views showing two types (pattern types) of basic tiles 731, 732 which are prepared in the element matrix acquisition part 51. Each of the basic tiles 731, 732 is an arrangement of elements in two rows and two columns consisting of two ON elements 721 each representing existence of a dot in a position of the ON element 721 in the matrix area and two OFF elements 722 each representing absence of a dot in a position of the OFF element 722 in the matrix area. In FIGS. 7A and 7B, the ON elements 721 and the OFF elements 722 are distinguished by hatching in the ON elements 721 (the same as in FIGS. 24A to 24D discussed later). In the basic tile 731 of FIG. 7A, the upper right and lower left elements are the ON elements 721 and the upper left and lower right elements are the OFF elements 722. In the basic tile 732 of FIG. 7B, the upper left and lower right elements are the ON elements 721 and the upper right and lower left elements are the OFF elements 722. As described, the basic tiles. 731, 732 prepared in the present preferred embodiment are two types of arrangements in each of which the two ON elements 721 are arranged diagonally and the two OFF elements 722 are arranged diagonally (i.e., each diagonal component has the same elements).

Figure 8:
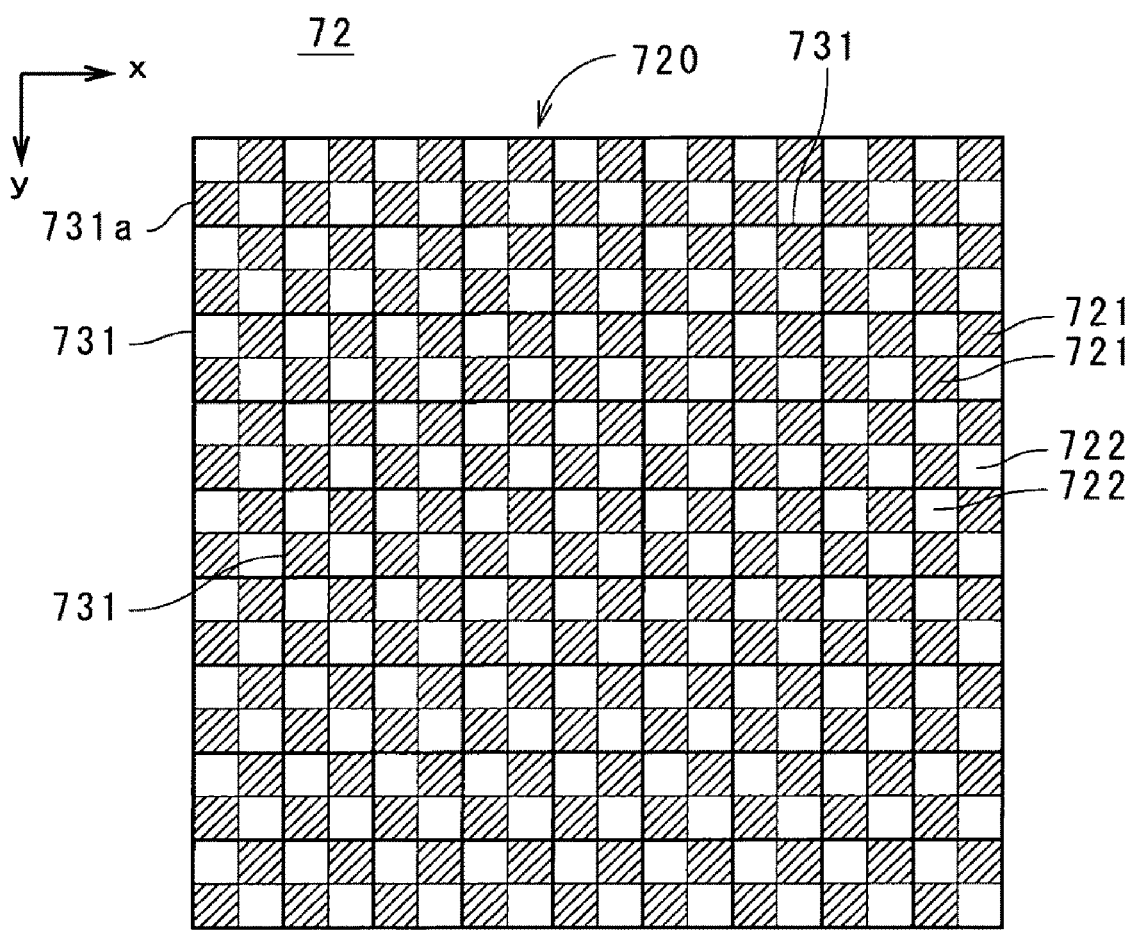
FIG. 8 is a view showing an element matrix.

As shown in FIG. 8, a plurality of basic tiles 731 of one type are arranged in the row direction (x direction) and the column direction (y direction) in a matrix area 72 to constitute an element matrix 720 (Step S12). In FIG. 8, the plurality of basic tiles 731 are arranged in 9 rows and 9 columns in the row and column directions to constitute the element matrix 720 where elements are arranged in 18 rows and 18 columns. The size of the element matrix 720 (i.e., the number of the basic tiles 731 arranged in Step S12) may be changed according to the size of a threshold matrix which is to be generated, but the element matrix 720 does not have to be a square matrix. However, each of the numbers in the row and column directions of the basic tiles 731 arranged in the matrix area is made to a value which is different from a power of two (the reason is described later). In the following discussion, the element matrix 720 is an arrangement of elements in K rows and L columns and a position of each basic tile 731 in FIG. 8 is referred to as a "tile position".

After the basic tiles 731 of FIG. 7A are uniformly arranged in the matrix area 72, a basic tile 731 of arbitrary one tile position is replaced with a basic tile 732 of the other type (hereinafter, referred to as "replacement basic tile 732") (Step S13). In this case, an upper left basic tile 731a in FIG. 8 is selected and replaced with a replacement basic tile 732a as shown by a thick-line rectangle in FIG. 9.

Subsequently, an evaluation value is calculated for each tile position in the matrix area 72 with using a later-discussed evaluation function to specify one tile position which is farthest from existing replacement basic tiles 732a and a basic tile 731 of the tile position is replaced with the replacement basic tile 732 (Step S14). In this time, since in halftoning of the original image 70 the threshold matrix 710 is spatially repeated both in the horizontal and vertical directions in response to the repeat areas 71 shown in FIG. 5, it is considered that, as shown by thick broken lines in FIG. 9, the replacement basic tile 732a repeatedly exists in element matrixes 720 (shown by double-dashed lines in FIG. 9) which are assumed to exist in 8-neighborhoods of the element matrix 720 (hereinafter, also referred to as "central element matrix 720"), as well as the central element matrix 720. As discussed later, the process of Step S14 is repeatedly performed a plurality of times and the plurality of basic tiles 731 are replaced with the replacement basic tiles 732. Therefore, an evaluation value $Et_n$ (xt, yt) of each tile position in the coordinates (xt, yt) of the matrix area 72 in obtaining a tile position of the basic tile 731 which is replaced in the nth replacement (with the nth replacement basic tile), is obtained by Eq. 1 where r is a number of the central element matrix 720 and the element matrixes 720 assumed in the 8-neighborhoods of the central element matrix 720 and $xt_{mr}$ and $yt_{mr}$ are respectively positions in the x direction and the y direction of the mth replacement basic tile 732 in the rth element matrix 720.

$$Et_n(xt, yt) = \sum_{m=0}^{n-1} \sum_{r=0}^{8} \frac{1}{(xt - xt_{mr})^2 + (yt - yt_{mr})^2} \quad \text{Eq. 1}$$

Actually, in the evaluation function of Eq. 1, a position $xt_{mr}$ in the x direction of the mth replacement basic tile 732 in the rth element matrix 720 is obtained by adding or subtracting the size in the x direction of the element matrix 720 in accordance with a number of the element matrix 720 (i.e., in accordance with a relative position of the element matrix 720 to the central element matrix 720), to/from a position in the x direction of the replacement basic tile 732 in the central element matrix 720 corresponding to the mth replacement basic tile 732 in the rth element matrix 720, or the position $xt_{mr}$ is obtained as the same position as that in the x direction of the replacement basic tile 732 in the central element matrix 720 corresponding to the mth replacement basic tile 732 in the rth element matrix 720. A position $yt_{mr}$ in the y direction is obtained by adding or subtracting the size in the y direction of the element matrix 720 in accordance with a number of the element matrix 720, to/from a position in the y direction of the replacement basic tile 732 in the central element matrix 720 corresponding to the mth replacement basic tile 732 in the rth element matrix 720, or the position $yt_{mr}$ is obtained as the same position as that in the y direction of the replacement basic tile 732 in the central element matrix 720 corresponding to the mth replacement basic tile 732 in the rth element matrix 720.

Figure 9:
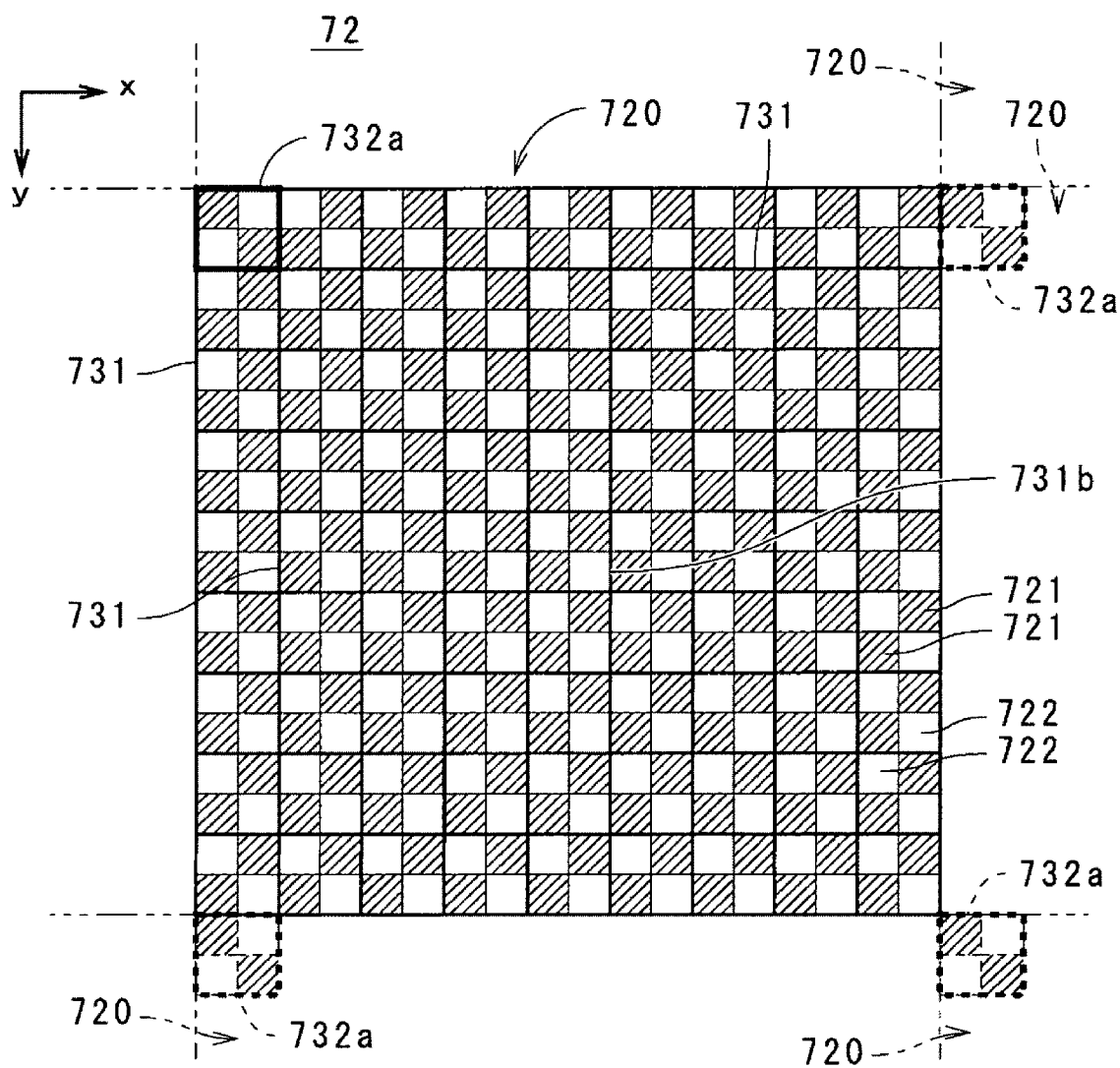
FIGS. 9 and 10 are views for explaining replacement to a replacement basic tile.
Figure 10:
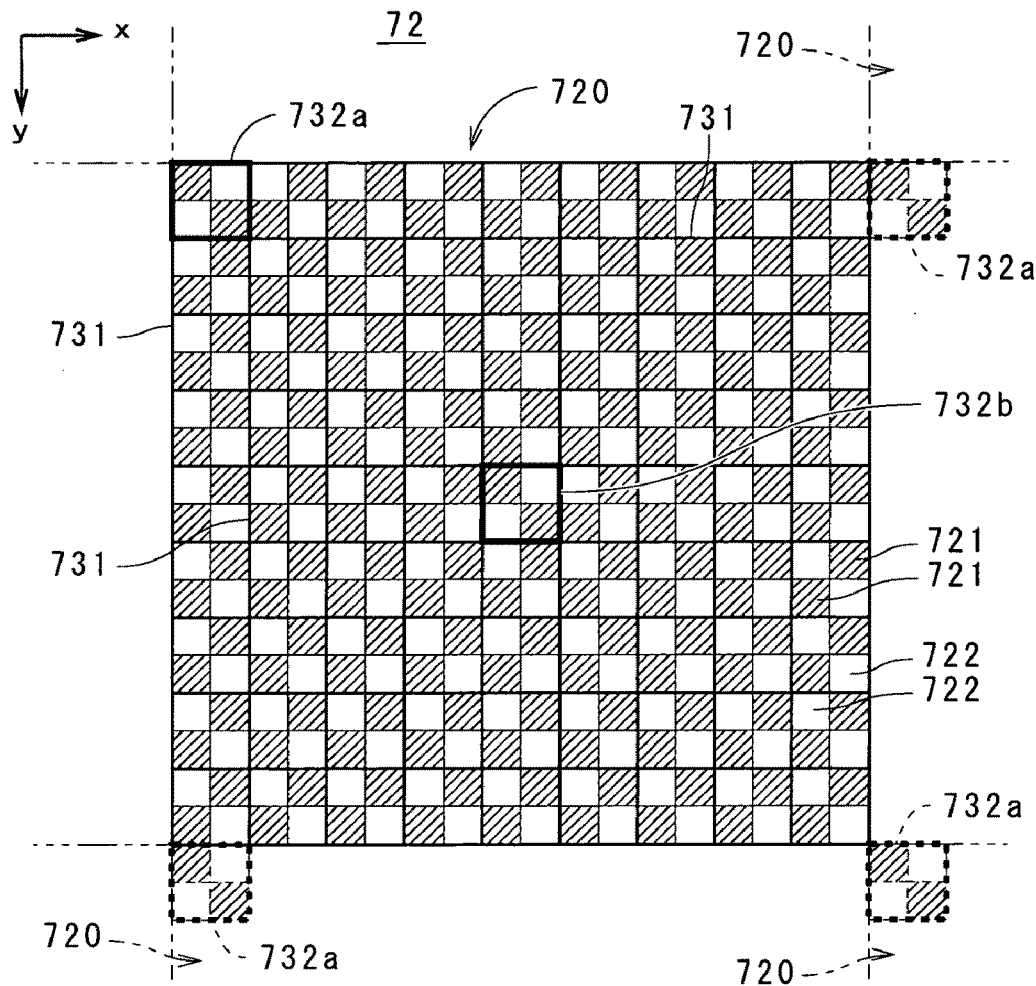

In this manner, the evaluation value relative to each tile position in the matrix area 72 is calculated, and then a tile position whose evaluation value is minimum is specified. For example, a basic tile 731b in FIG. 9 is specified in the element matrix 720 and the basic tile 731b is replaced with a replacement basic tile 732b as shown by a thick-line rectangle in FIG. 10. Since a sum of the reciprocals of square values of distances between each tile position in the central element matrix 720 and existing replacement basic tiles 732 in the central element matrix 720 and the element matrixes 720 assumed in the 8-neighborhoods of the central element matrix 720, is obtained as the evaluation value in the evaluation function of Eq. 1, the tile position whose evaluation value is minimum is farthest from existing replacement basic tiles 732 on the premise of spatial repetition of the threshold matrix 710.

Figure 11A:
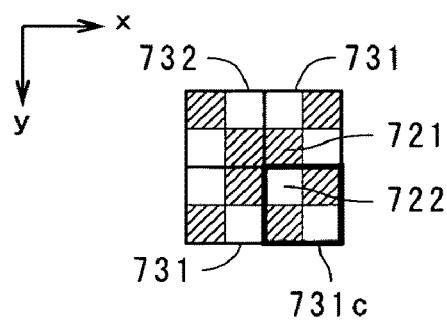
FIGS. 11A and 11B are views for explaining a prohibition condition.
Figure 11B:
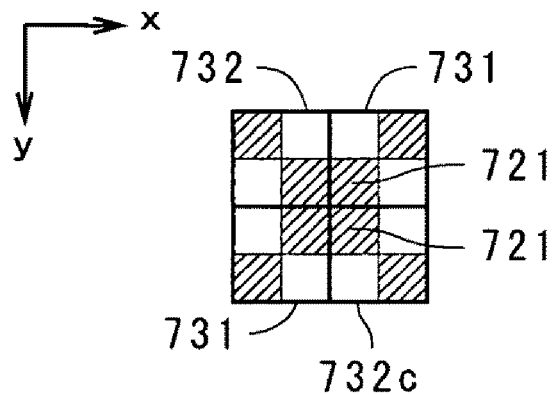
Figure 12A:
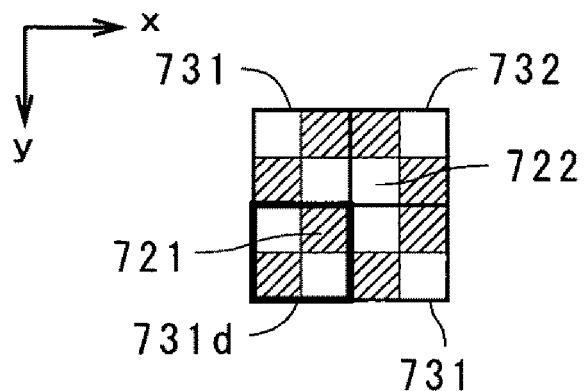
FIGS. 12A and 12B are views for explaining the prohibition condition.
Figure 12B:
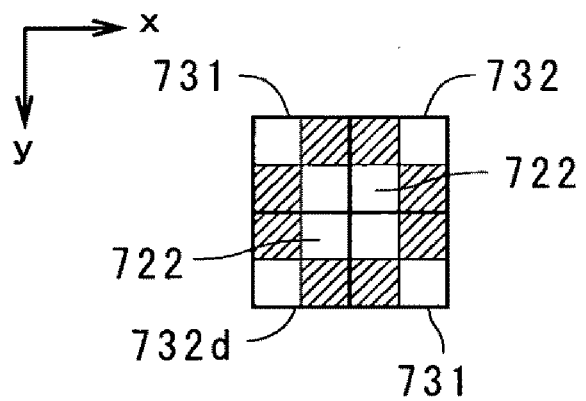

In the element matrix acquisition part 51, the process of calculating an evaluation value for each tile position in the element matrix 720 with using Eq. 1 and replacing the basic tile 731 of the tile position, whose evaluation value is minimum, with the replacement basic tile 732 is repeated by a predetermined number of times (e.g., the number of times corresponding to 30 to 70% of the number of tile positions in the element matrix 720) (Step S15). At this time, in the element matrix acquisition part 51, in a case where for example, a basic tile 731c in FIG. 11A of a tile position whose evaluation value is minimum is replaced with a replacement basic tile 732c as shown in FIG. 11B and thereby the central elements in two rows and two columns in an arrangement of elements in 4 rows and 4 columns are all ON elements 721, or in a case for example, a basic tile 731d in FIG. 12A of a tile position whose evaluation value is minimum is replaced with a replacement basic tile 732d as shown in FIG. 12B and thereby the central elements in two rows and two columns in an arrangement of elements in 4 rows and 4 columns are all OFF elements 722, replacement of the basic tiles 731c, 731d with the replacement basic tiles 732c, 732d is cancelled and a basic tile 731 of a tile position whose evaluation value is second smallest (small next to the cancelled tile position) is replaced with a replacement basic tile 732.

The above process of replacing the basic tile 731 with the replacement basic tile 732 can be considered as a process of simply setting the replacement basic tile 732 and in this case, the process of Step S13 becomes a process of setting the replacement basic tile 732 at arbitrary one tile position. The process of Step S14 becomes a process of setting a new replacement basic tile 732 at a tile position which is farthest from existing replacement basic tiles 732 in accordance with a prohibition condition for prohibiting an arrangement of only ON elements 721 or OFF elements 722 in an area of two rows and two columns, on the premise of spatial repetition of the threshold matrix (i.e., on the assumption of spatial repetition of the threshold matrix). The process of Step S14 is repeated by a predetermined number of times by executing the process of Step S15.

Figure 13:
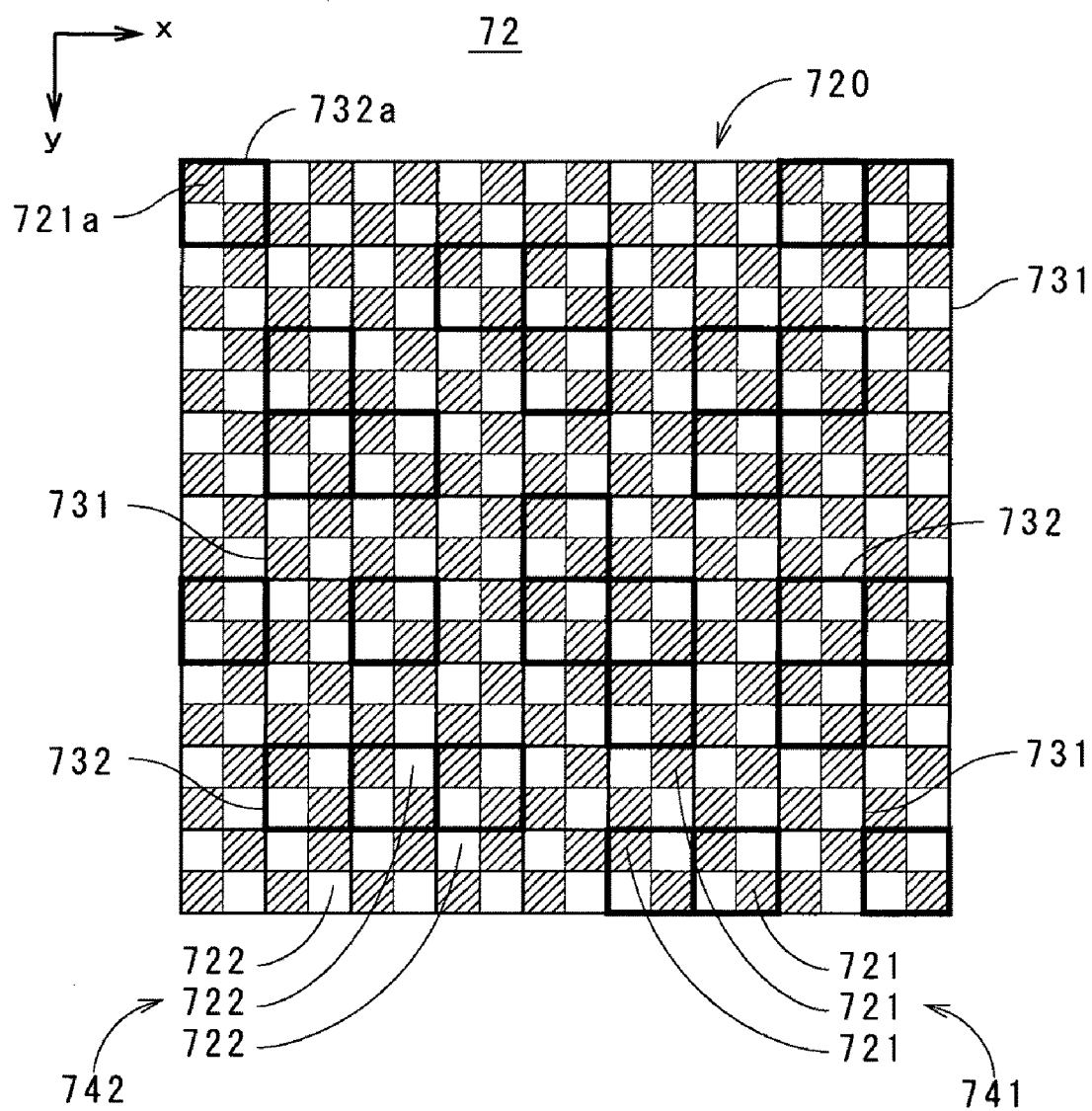
FIG. 13 is a view showing a basic element matrix.

As a result, an element matrix 720, where a plurality of basic tiles each of which is one of the plurality of types of basic tiles 731, 732 are arranged in the matrix area 72, is acquired as shown in FIG. 13. In the operation part 5, the element matrix 720 of FIG. 13 is dealt with one representing an arrangement of dots in a gray level of 50% (a gray level corresponding to tone values (halftone dot area rates) of 50%). In the element matrix 720, since the basic tiles 731, 732 of the same type are irregularly dispersed, each of the ON elements 721 and the OFF elements 722 is also arranged irregularly. In FIG. 13, the replacement basic tiles 732 which are replaced are shown by thick-line rectangles. In the following discussion, the element matrix 720 representing an arrangement of dots in a gray level of 50% is referred to as a "basic element matrix 720".

In the turn-on order determining part 52, a set of all ON elements 721 in the basic element matrix 720 of FIG. 13 is considered as a highlight dot pattern 741 and arbitrary one ON element 721 on the highlight dot pattern 741 is selected. In this case, an ON element 721a at the end on the (−x) side and at the end on the (−y) side is selected and a dot is set at the ON element 721a as shown by a cross-hatched rectangle in FIG. 14 (Step S16).

Subsequently, an evaluation value is calculated for each ON element 721 on the highlight dot pattern 741 with using a predetermined evaluation function to specify one ON element 721 which is farthest from existing dots on the highlight dot pattern 741, and a new dot is added to the ON element 721 on the highlight dot pattern 741 (Step S17). In this time, similarly to the replacement process of the basic tile in Step S14, spatial repetition of the threshold matrix in halftoning of the original image 70 is premised and as discussed later, the process of Step S17 is repeated a plurality of times and a plurality of new dots are added to elements on the highlight dot pattern 741. An evaluation value $Eh_n$ (xh, yh) of each ON element 721 in the coordinates (xh, yh) of the matrix area 72 in obtaining an ON element 721 to which the dot is set in the nth setting (the nth new dot is set), is obtained by Eq. 2 where r is a number of the central element matrix 720 and the element matrixes 720 assumed in the 8-neighborhoods of the central element matrix 720 (see FIG. 9) and $xh_{mr}$ and $yh_{mr}$ are respectively positions in the x direction and the y direction of the mth dot which is set in the rth element matrix 720.

$$Eh_n(xh, yh) = \sum_{m=0}^{n-1} \sum_{r=0}^{8} \frac{1}{(xh - xh_{mr})^2 + (yh - yh_{mr})^2} \quad \text{Eq. 2}$$

Actually, in the evaluation function of Eq. 2, a position $xh_{mr}$ in the x direction of the mth dot which is set in the rth element matrix 720 is obtained by adding or subtracting the size in the x direction of the element matrix 720 in accordance with a number of the element matrix 720 (i.e., in accordance with a relative position of the element matrix 720 to the central element matrix 720), to/from a position in the x direction of the dot in the central element matrix 720 corresponding to the mth dot in the rth element matrix 720, or the position $xh_{mr}$ is obtained as the same position as that in the x direction of the dot in the central element matrix 720 corresponding to the mth dot in the rth element matrix 720. A position $yh_{mr}$ in the y direction is obtained by adding or subtracting the size in the y direction of the element matrix 720 in accordance with a number of the element matrix 720, to/from a position in the y direction of the dot in the central element matrix 720 corresponding to the mth dot in the rth element matrix 720, or the position $yh_{mr}$ is obtained as the same position as that in the y direction of the dot in the central element matrix 720 corresponding to the mth dot in the rth element matrix 720 (the same as in Eq. 3 discussed later).

Figure 14:
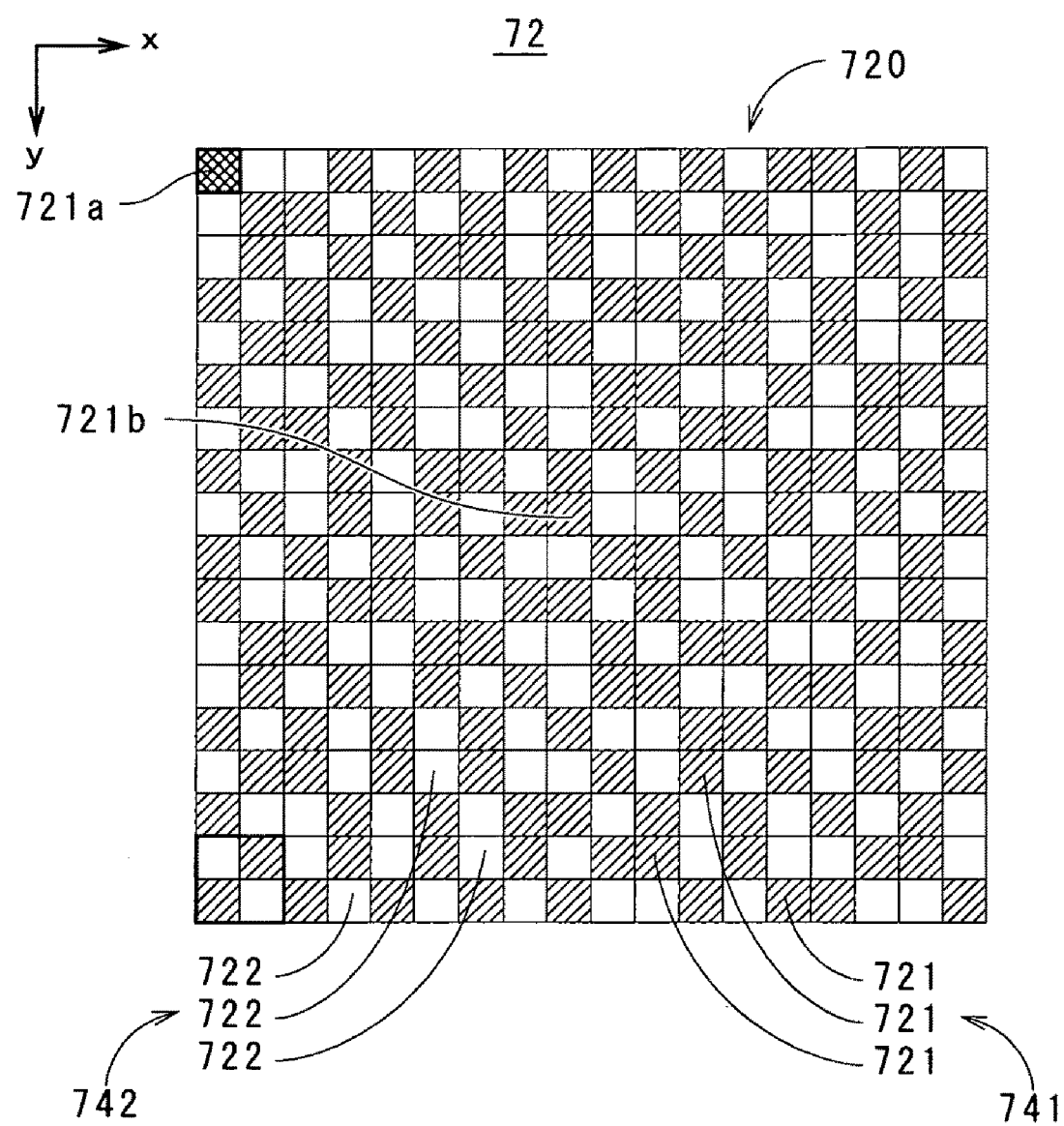
FIG. 14 is a view for explaining a process of determining a turn-on order.

After the evaluation value relative to each ON element 721 on the highlight dot pattern 741 is calculated, an ON element 721 whose evaluation value is minimum is specified. For example, an ON element 721*b* in FIG. 14 is specified in the highlight dot pattern 741 and a new dot is added to the ON element 721*b*. Since a sum of the reciprocals of square values of distances between each ON element 721 in the central element matrix 720 and existing dots in the central element matrix 720 and the element matrixes 720 assumed in the 8-neighborhoods of the central element matrix 720, is obtained as the evaluation value in the evaluation function of Eq. 2, the ON element 721 whose evaluation value is minimum is farthest from existing dots on the premise of spatial repetition of the threshold matrix 710 (the same as in Eq. 3 discussed later).

In this manner, in the turn-on order determining part 52, the process of calculating an evaluation value for each ON element 721 on the highlight dot pattern 741 with using Eq. 2 and adding a new dot to an ON element 721 whose evaluation value is minimum is repeated until n in Eq. 2 becomes (K×L/2−1) with using the element number L in the x direction and the element number K in the y direction of the element matrix 720 (Step S18). With this operation, determined is a turn-on order (lighting order) in which dots are added to elements in accordance with increase in gray level on a highlight side (i.e., variation in gray level from 0% to 50% in a range of gray levels where the number of dots in a tint image is smaller in comparison with a gray level of 50%).

After the turn-on order is determined, a set of all OFF elements 722 in the basic element matrix 720 of FIG. 14 is considered as a shadow dot pattern 742 in the turn-off order determining part 53, arbitrary one OFF element 722 on the shadow dot pattern 742 is selected, and dots are set at all OFF elements 722 excluding the above OFF element 722 (Step S19).

Subsequently, an evaluation value is calculated for each OFF element 722 on the shadow dot pattern 742, and a dot of one OFF element 722 on the shadow dot pattern 742, the dot being farthest from OFF elements 722 in each of which a dot is not set on the shadow dot pattern 742, is removed (Step S20). In this time, similarly to the replacement process of the basic tile 731 in Step S14, spatial repetition of the threshold matrix in halftoning of the original image 70 is premised, and as discussed later, the process of Step S20 is repeated a plurality of times to remove a plurality of dots on the shadow dot pattern 742. An evaluation value for each OFF element 722 on the shadow dot pattern 742 is calculated with use of the same equation as Eq. 2 used in determining the turn-on order. Specifically, an evaluation value $Es_n$ (xs, ys) of each OFF element 722 in the coordinates (xs, ys) of the matrix area 72 in obtaining an OFF element 722 whose dot is removed in the nth removing (the nth dot is removed), is obtained by Eq. 3 where r is a number of the central element matrix 720 and the element matrixes 720 assumed in the 8-neighborhoods of the central element matrix 720 (see FIG. 9) and $xs_{mr}$ and $ys_{mr}$ are respectively positions in the x direction and the y direction of the OFF element 722 where the mth dot is removed in the rth element matrix 720.

$$Es_n(xs, ys) = \sum_{m=0}^{n-1} \sum_{r=0}^{8} \frac{1}{(xs - xs_{mr})^2 + (ys - ys_{mr})^2} \quad \text{Eq. 3}$$

After the evaluation value relative to each OFF element 722 on the shadow dot pattern 742 is calculated, an OFF element 722 whose evaluation value is minimum is specified to remove a dot of the OFF element 722. In this manner, in the turn-off order determining part 53, the process of calculating an evaluation value for each OFF element 722 on the shadow dot pattern 742 with using Eq. 3 and removing a dot of an OFF element 722 whose evaluation value is minimum is repeated until n in Eq. 3 becomes (K×L/2−1) with using the element number L in the x direction and the element number K in the y direction of the element matrix 720 (Step S21). With this operation, determined is a turn-off order (extinction order) in which dots are removed from elements in accordance with decrease in gray level on a shadow side (i.e., variation in gray level from 100% to 50% in a range of gray levels where the number of dots in a tint image is greater in comparison with a gray level of 50%).

After the turn-on order and the turn-off order are determined as described above, numbers of integer which increase by 1 from (K×L/2+1) are sequentially assigned to all the elements on the shadow dot pattern 742, from one having the largest turn-off number and thereby, determined is the order (of elements in the element matrix 720) in which dots are formed at pixels in a halftone image corresponding to positions of elements in the element matrix 720 in accordance with increase in gray level of the original image 70 (increase in all the range of gray levels of the original image 70). In a case where the original image is represented by gray levels of 256 (8 bit) from 0 to 255, the ordinal numbers in the order are converted into the range of 0 to 254 and the converted ordinal numbers are respectively assigned to the corresponding elements as threshold values (i.e., the ordinal numbers in the order are compressed in 255 gray levels), to complete a threshold matrix 710 of one color (Step S22).

Figure 15:
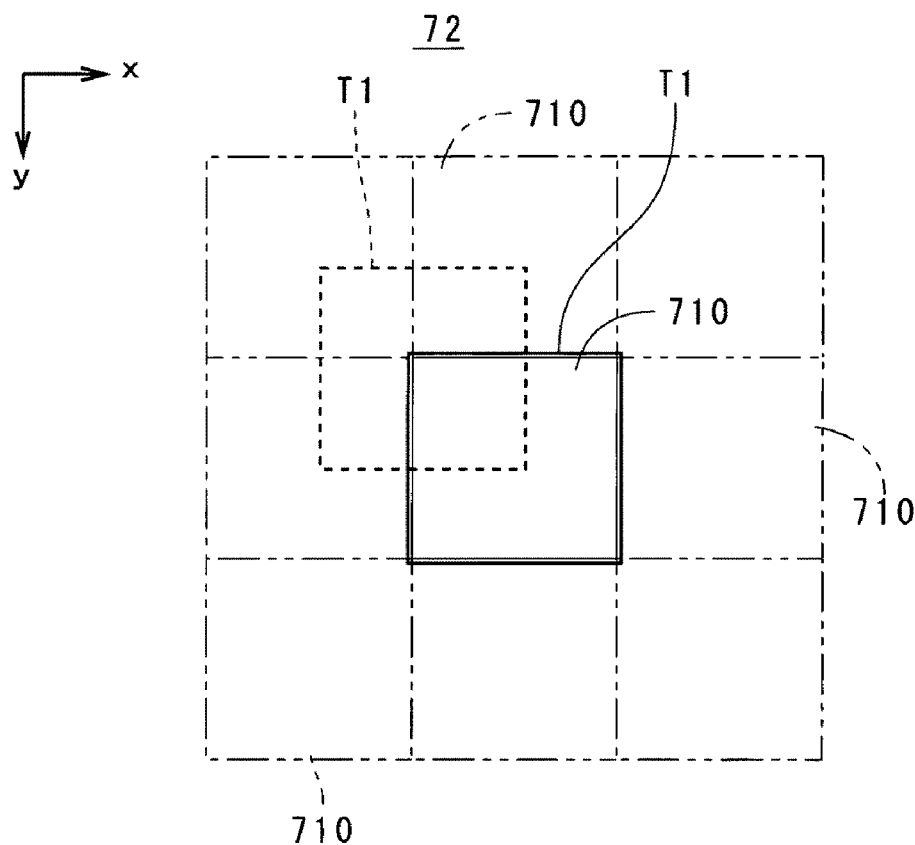
FIG. 15 is a view for explaining a process of acquiring a threshold matrix of another color.

After a threshold value of each element is determined to complete the threshold matrix 710 of one color, in the matrix area 72 shown in FIG. 15 where the threshold matrix 710 and eight threshold matrixes 710 (shown by double-dashed lines in FIG. 15) assumed in 8-neighborhoods of the threshold matrix 710 are arranged, a rectangle T1 indicating the outer form of the threshold matrix 710 is shifted in the x and y directions by a predetermined distance from the original position of the threshold matrix 710, and an arrangement of threshold values included in a shifted rectangle T1 (shown by a broken line in FIG. 15) is extracted to acquire a threshold matrix 710 of another color (Step S23). Since threshold matrixes 710 of black, cyan, magenta and yellow are prepared in the present preferred embodiment, amounts of shift of the rectangle T1 are changed one another to acquire the threshold matrixes 710 of the remaining three colors other than the threshold matrix 710 generated through the above processes of Steps S11 to S22. Then, the threshold matrix 710 of each color component is stored in the corresponding matrix memory 42 in the main body control part 4 through the communication part 109 of the computer 11 and the threshold matrixes 710 are used for printing of the original image 70 in the printer 1.

There may be a case where data of the threshold matrixes 710 is recorded in an electronic apparatus-readable/writable recording medium 92 (including a computer) by the reader/writer 108 and the recording medium 92 is read out by the main body control part 4 to store the data of the threshold matrixes 710 in the matrix memories 42. The recording medium 92 is read out by another apparatus and a halftone image may be generated with use of the threshold matrixes 710 in the apparatus.

Figure 16A:
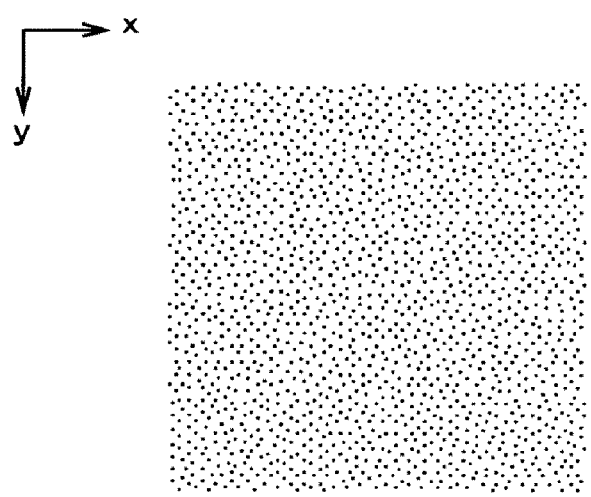
Figure 17B:
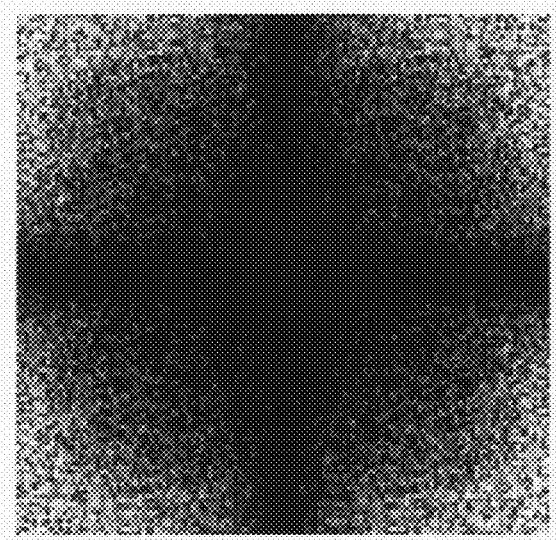

FIGS. 16A and 16B are views showing halftone images (tint images) in a case where original images with uniform gray levels of 10% and 50% are represented by halftoning with using the threshold matrix 710. Graininess hardly appears in the halftone images of FIGS. 16A and 16B. When characteristics of spatial frequencies of the halftone images in FIGS. 16A and 16B are represented in two-dimensional frequency spaces, the characteristics shown in FIGS. 17A and 17B are acquired, and they show that the halftone images of FIGS. 16A and 16B have directional properties (directivities).

As discussed above, in the threshold matrix generating apparatus achieved by the computer 11, the plurality of basic tiles 731, 732 are arranged in the matrix area 72 while prohibiting an arrangement of only the ON elements 721 or the OFF elements 722 in an area of two rows and two columns, to acquire the basic element matrix 720 representing an arrangement of dots in a gray level of 50%. After arbitrary one element is specified in each of the highlight dot pattern 741 which is a set of the ON elements 721 in the basic element matrix 720 and the shadow dot pattern 742 which is a set of the OFF elements 722 in the basic element matrix 720, the process of specifying an element which is farthest from specified elements is repeated to acquire the turn-on order in which dots are added to elements in accordance with increase in gray level on a highlight side and the turn-off order in which dots are removed from elements in accordance with decrease in gray level on a shadow side, and a threshold value of each element in the matrix area 72 is determined in accordance with the turn-on order and the turn-off order. As a result, it is possible to generate the threshold matrix 710 which is capable of reducing graininess (specifically, in a gray level of 50% and a gray level which is away from 50%) in the halftone image generated by halftoning the original image.

If a plurality of basic tiles are randomly set in the matrix area 72, a phenomenon where basic tiles of the same type are partly (locally) concentrated in the basic element matrix corresponding to a gray level of 50% or the like occurs and there is a possibility an undesirable pattern (singular points) locally appears in a halftone image. On the other hand, in the element matrix acquisition part 51, after a basic tile of one type is set at arbitrary one tile position, the process of setting a new basic tile of the type at a tile position which is farthest from existing basic tiles of the same type is repeated, and thereby a basic element matrix corresponding to a gray level of 50% is generated deterministically (uniquely without using a random number). With this operation, it is possible to suppress appearance of singular points in the halftone image.

Since the threshold matrixes 710 of color components which have different arrangements from one another are used in the printer, it is possible to suppress occurrence of moire in a printed image, caused by interference of halftone images of the plurality of color components.

Though, in the above process of Step S23, the threshold matrix 710 of another color component is derived from the threshold matrix 710 of one color component which is generated through the processes of Steps S11 to S22, there may be a case where, in a matrix area of another color component which is different from the threshold matrix 710 of one color component, an element matrix with a different size (i.e., the size is the number of elements in the x direction and/or the number of elements in the y direction) is defined and the same processes as those of Steps S11 to S22 are performed to generate the threshold matrix 710 of another color component which has the different size from the threshold matrix 710 of one color component. Also in this case, since arrangements of threshold values of respective color components are different from one another, it is possible to suppress occurrence of moire in a printed image, caused by interference of halftone images of the plurality of color components.

Figure 18:
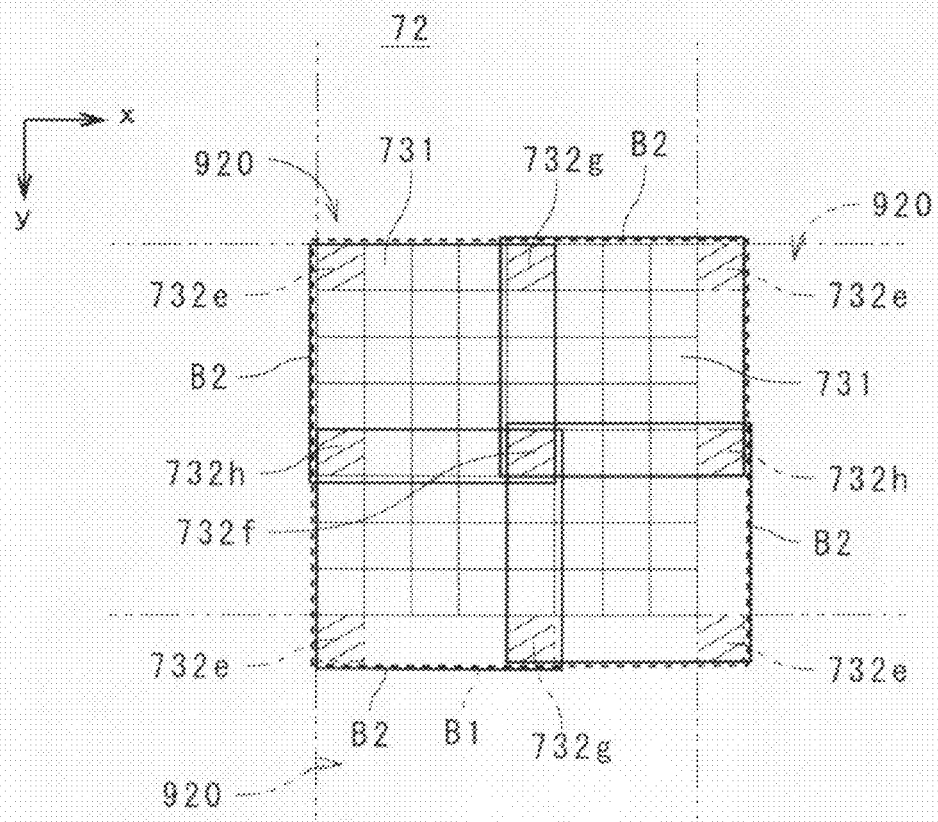
FIG. 18 is a view showing an element matrix.

Next, discussion will be made on the reason why each of the numbers in the row and column directions of the basic tiles arranged in the matrix area 72 is made to a different value from a power of two. FIG. 18 is a view showing an element matrix 920 in accordance with an example for comparison, where basic tiles 731, 732 each of which is an arrangement in two rows and two columns are shown by rectangles. In FIG. 18, each of the numbers of elements in the x direction and the y direction of the element matrix 920 is a power of two.

Figure 6A:
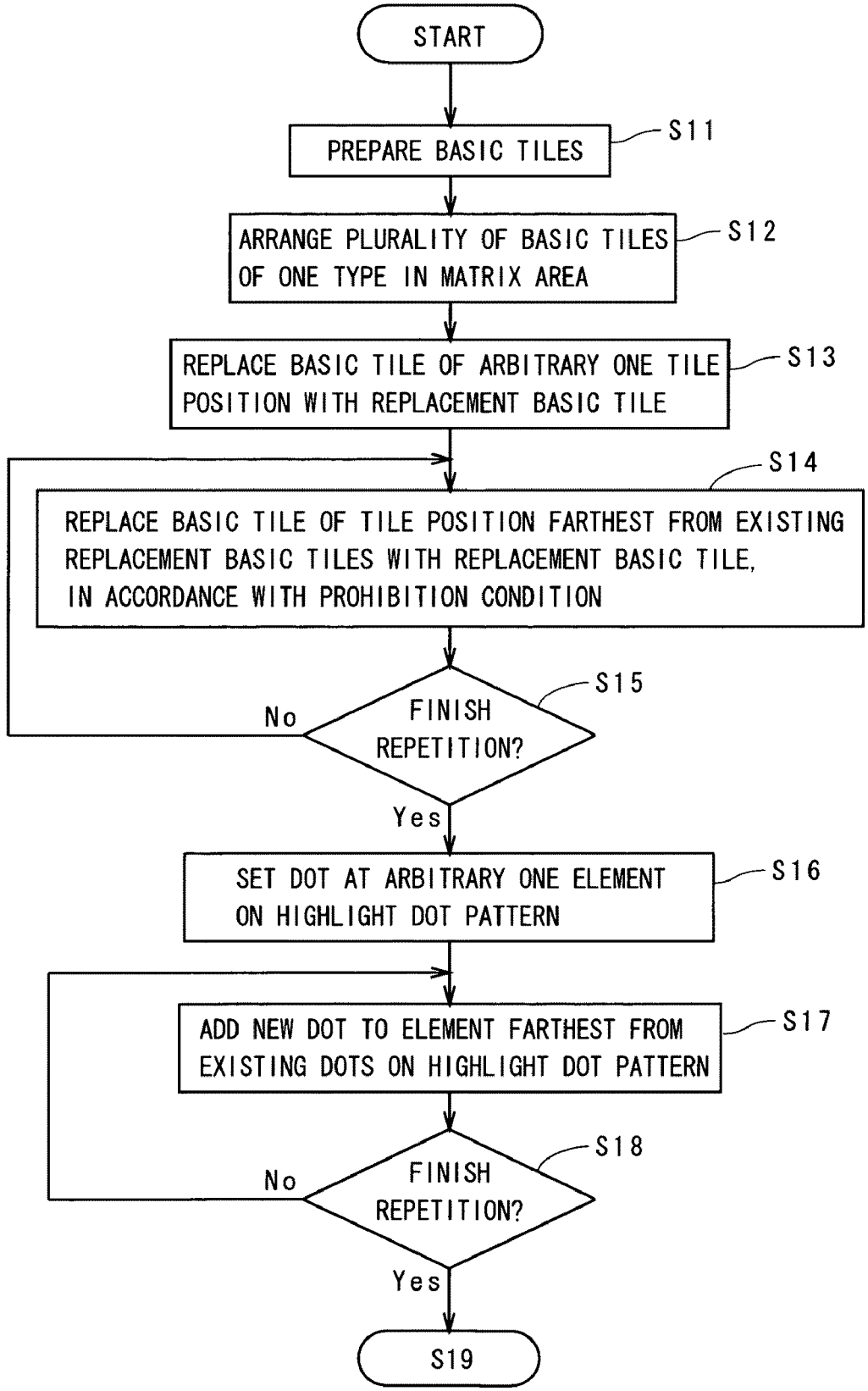
FIGS. 6A and 6B are flowcharts showing a process flow for generating the threshold matrix.
Figure 19:
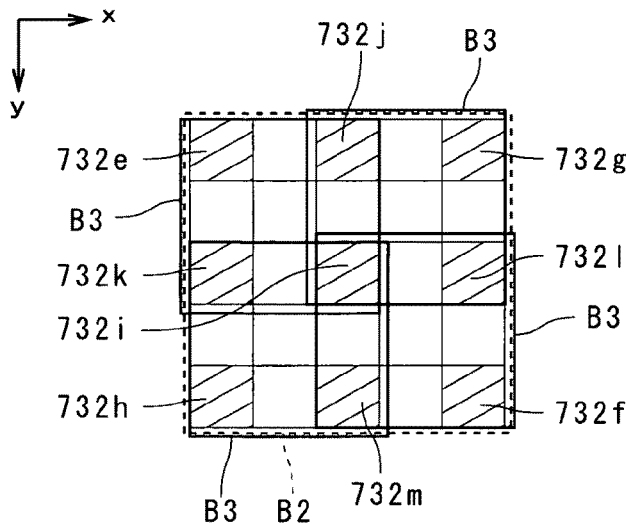
FIG. 19 is a view showing a replacement tile group rectangle.

In the element matrix 920 of FIG. 18, after the plurality of basic tiles 731 are arranged in the process of Step S12 in FIG. 6A, a basic tile 731 at the end on the (−x) side and at the end on the (−y) side is replaced with a replacement basic tile 732e in the process of Step S13 (replacement basic tiles 732 are hatched in FIG. 18 and the same is applied to FIG. 19). Subsequently, in the process of Step S14, the (precisely) central position of a rectangle B1 (shown by a broken line in FIG. 18 and hereinafter, referred to as "replacement tile group rectangle B1"), where the replacement basic tile 732e in the central element matrix 920 and the replacement basic tiles 732e in three element matrixes 920 which are respectively assumed on the right side ((+x) side), on the lower right side ((+x) side and (+y) side), and on the lower side ((+y) side) of the element matrix 920 are set on the four corners of the rectangle B1, is considered as a tile position which is farthest from existing replacement basic tiles 732e, and the basic tile 731 of the tile position is replaced with a replacement basic tile 732f. The number of elements in each of the x direction and the y direction of the replacement tile group rectangle B1 is a value obtained by adding two to a power of two (as described earlier, the basic tile 731, 732 which is an arrangement in two rows and two columns is shown by a rectangle in FIG. 18).

In the following repetition of the process of Step S14, a basic tile 731 which is accurately arranged on the (+x) side of the replacement basic tile 732e and accurately arranged on the (−y) side of the replacement basic tile 732f and a basic tile 731 which is accurately arranged on the (+y) side of the replacement basic tile 732e and accurately arranged on the (−x) side of the replacement basic tile 732f, are respectively replaced with replacement basic tiles 732g, 732h as shown in FIG. 18. With this operation, four replacement tile group rectangles B2 in each of which the replacement basic tiles 732e to 732h are set on the four corners are assumed in the replacement tile group rectangle B1 (the four replacement tile group rectangles B2 are partially overlapped with one another). The number of elements in each of the x direction and the y direction of each replacement tile group rectangle B2 is a value obtained by adding two to a power of two.

FIG. 19 is a view showing only the upper left-replacement tile group rectangle B2 in FIG. 18 and the replacement tile group rectangle B2 is shown by a broken line in FIG. 19. In the following repetition of the process of Step S14, the central tile position of each replacement tile group rectangle B2 is considered as a position which is farthest from existing replacement basic tiles 732, and a basic tile 731 of the position is replaced with a replacement basic tile 732i as shown in FIG. 19. Then, by repeating the process of Step S14, a basic tile 731 which is accurately arranged on (+x) side of the replacement basic tile 732e and accurately arranged on the (−y) side of the replacement basic tile 732i, a basic tile 731 which is accurately arranged on the (+y) side of the replacement basic tile 732e and accurately arranged on the (−x) side of the replacement basic tile 732i, a basic tile 731 which is accurately arranged on the (+x) side of the replacement basic tile 732i and accurately arranged on the (−y) side of the replacement basic tile 732f, and a basic tile 731 which is accurately arranged on (+y) side of the replacement basic tile 732i and accurately arranged on the (−x) side of the replacement basic tile 732f, are respectively replaced with replacement basic tiles 732j, 732k, 732l, and 732m. With this operation, four replacement tile group rectangles B3 in each of which four replacement basic tiles 732 are set on the four corners are assumed in the replacement tile group rectangle B2 (the four replacement tile group rectangles B3 are partially overlapped with one another), and the number of elements in each of the x direction and the y direction of each replacement tile group rectangle B3 is a value obtained by adding two to a power of two.

Since an internal arrangement of the replacement basic tiles 732 in each of the other replacement tile group rectangles B2 is the same as that shown in FIG. 19, a basic element matrix which is acquired finally is one in which the replacement basic tiles 732 are regularly arranged. In a case where each of the numbers of elements in the x direction and the y direction of the element matrix 920 is a power of two, an arrangement of dots in a halftone image in the vicinity of a gray level of 50% is regular and there is a possibility moire appears in the halftone image, depending on the original image 70 to be printed.

Though the above discussion is made on the case where the number of elements in each of the x direction and the y direction is a power of two, when the number of elements in one of the x and y directions is different from a power of two, the replacement basic tile 732 cannot be set at the central position of the replacement tile group rectangle in repetition of Step S14, to cause irregularity in an arrangement of the replacement basic tiles 732. Since this irregularity affects arrangements of the replacement basic tiles 732 in the other replacement tile group rectangles, a final element matrix is not one in which the replacement basic tiles 732 are regularly arranged. Therefore, in order to suppress occurrence of moire in the halftone image caused by interference between the original image and the threshold matrix, it is required that the number of elements in at least one of the row direction and the column direction (preferably, each of the numbers of elements in the both directions) in the element matrix is made to a value which is different from a power of two, to prevent basic tiles of one type from being regularly arranged in the basic element matrix representing an arrangement of dots in a gray level of 50%.

Figure 20:
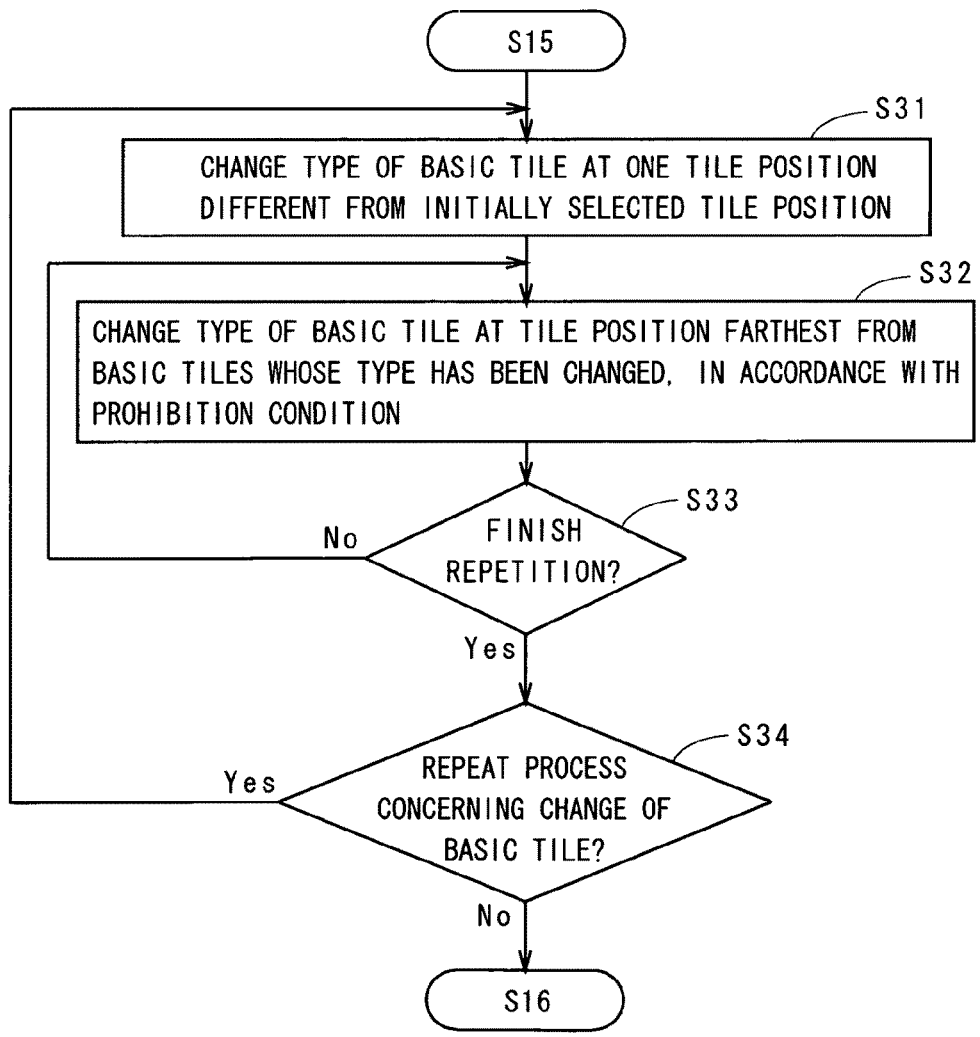
FIG. 20 is a flowchart showing a part of a process flow for generating a threshold matrix.

Next discussion will be made on another exemplary generation process of a threshold matrix. FIG. 20 is a flowchart showing a part of generation process of a threshold matrix and shows processes which are performed between Step S15 and Step S16 in FIG. 6A.

Figure 21:
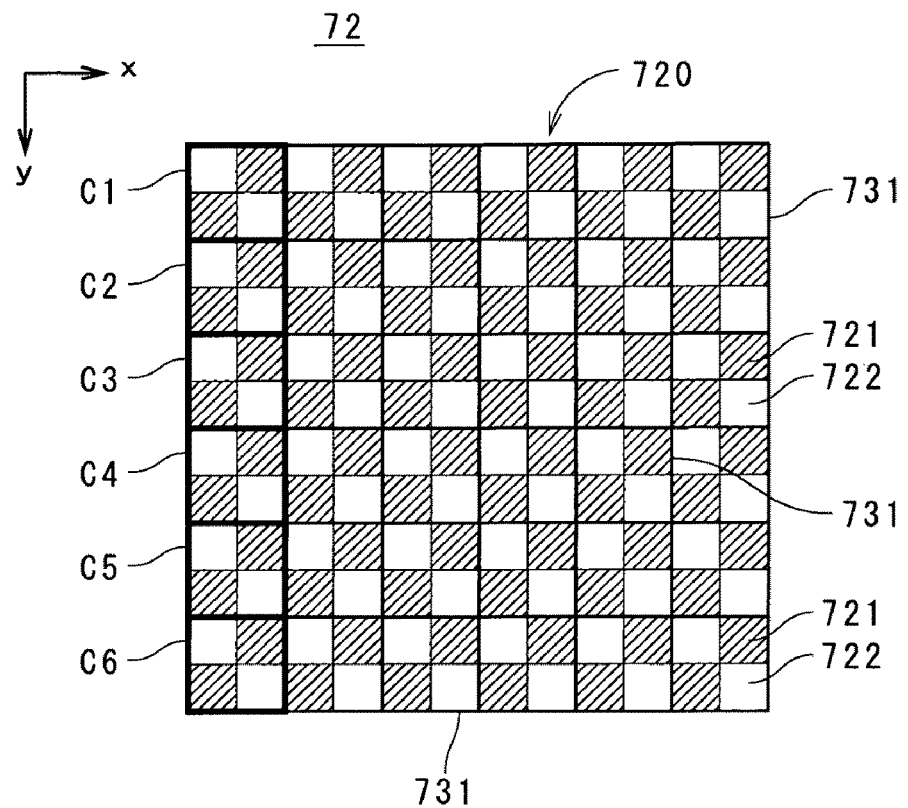
FIG. 21 is a view showing a part of an element matrix.

Also in this process, similarly to the above-discussed process, the two types of basic tiles 731, 732 shown in FIGS. 7A and 7B are prepared (FIG. 6A: Step S11) and the plurality of basic tiles 731 of one type are arranged in the matrix area 72 as shown in FIG. 21 (Step S12). A basic tile 731 which is arranged at a tile position at the end on the (−x) side and at the end on the (−y) side is replaced with the replacement basic tile 732 (the tile position is shown by a thick-line rectangle C1 in FIG. 21 and hereinafter, referred to as an "initially selected tile position") (Step S13). The processes of replacing a basic tile 731 at a tile position which is farthest from existing replacement basic tiles 732 with a replacement basic tile 732 in accordance with the prohibition condition for prohibiting an arrangement of only the ON elements 721 or the OFF elements 722 in an area of two rows and two columns, are performed by a predetermined number of times (Steps S14, S15).

Subsequently, another tile position which is different from the initially selected tile position C1 is selected. For example, a tile position C2 on the (+y) side of the initially selected tile position C1 in FIG. 21 is selected and the type of the basic tile of the tile position is changed (Step S31). Since FIG. 21 shows the element matrix 720 immediately after the plurality of basic tiles 731 of one type are arranged in the matrix area 72, the type of all the basic tiles is the basic tile 731 in FIG. 7A, however, in the actual process of Step S31, the type of the basic tile of the tile position C2 is not limited to the basic tile 731. Therefore, in a case where the basic tile 731 is set at the tile position C2, the type of the basic tile of the tile position C2 is changed to the basic tile 732, and in a case where the basic tile 732 is set at the tile position C2, the type of the basic tile of the tile position C2 is changed to the basic tile 731. In the following discussion, a tile position selected in the process of Step S31 is referred to as an "initially selected tile position" similarly to the initially selected tile position C1.

In the element matrix acquisition part 51, similarly to the processes of Steps S14, S15, a process of changing a type of a basic tile at a tile position which is farthest from basic tiles whose type has been changed is performed in accordance with the prohibition condition for prohibiting an arrangement of only the ON elements 721 or the OFF elements 722 in an area of two rows and two columns, on the premise of spatial repetition of the threshold matrix (Step S32) and the process of Step S32 is repeated by a predetermined number of times (Step S33).

After it is confirmed the process concerning change of the basic tile is repeated (Step S34), for example, a tile position C3 on the (+y) side of the initially selected tile position C2 is selected and the type of the basic tile of the tile position is changed (Step S31), and the process of changing a type of a basic tile which is set at a tile position farthest from basic tiles whose type has been changed in the processes after Step S31 performed right before is repeated in accordance with the prohibition condition on the premise of spatial repetition of the threshold matrix (Steps S32, S33). The processes of Steps S31 to S33 are considered as one loop process and the loop process is repeated a plurality of times (Step S34). At this time, in the process of Step S31 in the first loop process, one tile position C2 which is different from the initially selected tile position C1 selected in the process of Step S13 is selected. In the process of Step S31 in the second loop process, one tile position C3 which is different from the initially selected tile positions C1, C2 is selected and in the process of Step S31 in the third loop process, one tile position C4 which is different from the initially selected tile positions C1 to C3 is selected. Also, in the process of Step S31 in the fourth loop process, one tile position C5 which is different from the initially selected tile positions C1 to C4 is selected and in the process of Step S31 in the fifth loop process, one tile position C6 which is different from the initially selected tile positions C1 to C5 is selected.

Figure 6B:
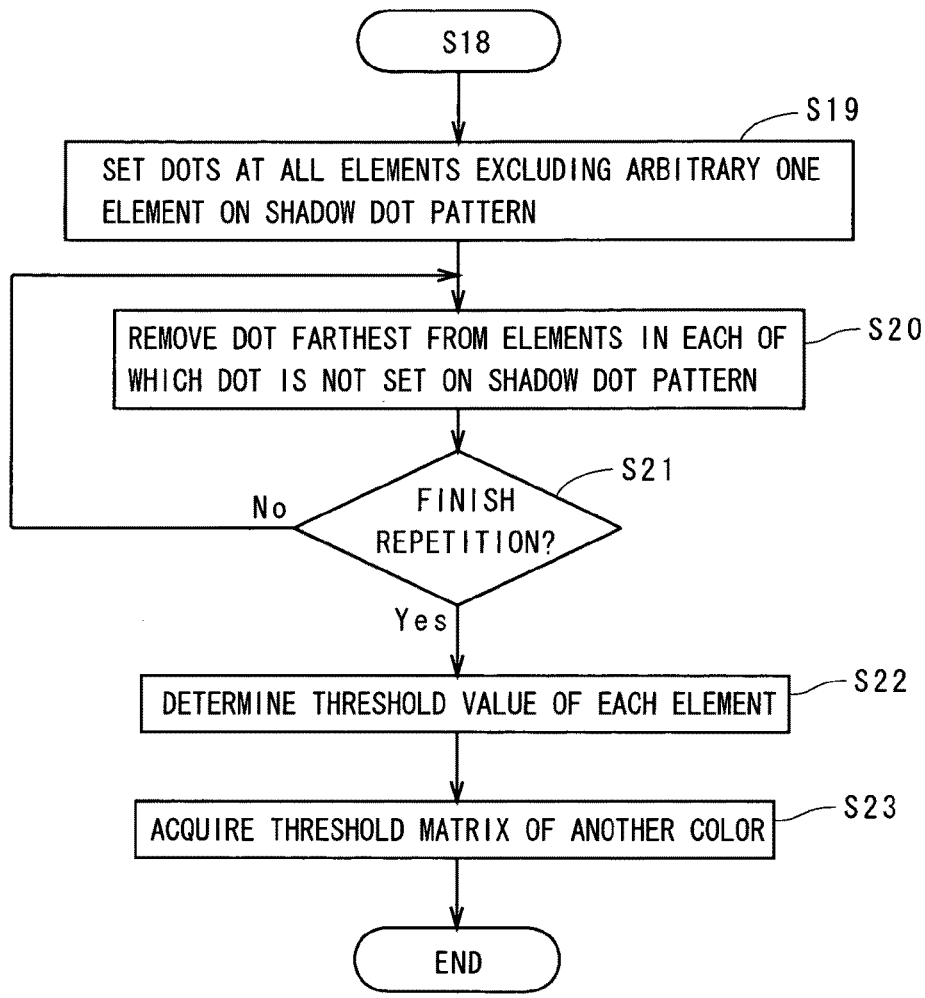

After a predetermined number of times of loop process are finished and a final element matrix 720 (i.e., the basic element matrix 720) representing an arrangement of dots in a gray level of 50% is acquired (Step S34), similarly to the above-discussed processes, a turn-on order in which dots are added to elements on a highlight dot pattern 741 in accordance with increase in gray level on a highlight side and a turn-off order in which dots are removed from elements on a shadow dot pattern 742 in accordance with decrease in gray level on a shadow side are determined, and then a threshold value of each element in the matrix area 72 is determined in accordance with the turn-on order and the turn-off order, to complete a threshold matrix 710 (FIGS. 6A and 6B: Steps S16 to S22).

In this process, in the matrix area 72 where the plurality of basic tiles 731, 732 are arranged, the processes of changing a type of a basic tile which is set at a tile position farthest from basic tiles whose type has been changed, are repeated with change of a tile position of a basic tile whose type is first changed to thereby increase irregularity in an arrangement of basic tiles of the same type in the basic element matrix 720. As a result, it is possible to generate the threshold matrix 710 which is capable of further suppressing occurrence of moire in the halftone image.

Next discussion will be made on a technique for generating a threshold matrix suitable for a mechanism (mechanisms) in accordance with printing in the printer 1. In the operation part 5, first, the processes of Steps S11 to S15 of FIG. 6A are performed to acquire a basic element matrix 720 corresponding to a gray level of 50%. In the present operation example, the number of elements in the column direction (y direction) of the element matrix 720 corresponding to an arrangement direction of the outlets 231 in the head 21 is α. Since the basic tiles 731, 732 of FIGS. 7A and 7B are used, at least one ON element 721 certainly exists in each of all positions in the row direction and the column direction in the basic element matrix 720. In the following discussion, a group of elements arranged in the row direction at each of positions in the column direction in the basic element matrix 720 corresponding to the arrangement direction of the plurality of outlets 231, is referred to as an "element group".

After a dot is set at arbitrary one ON element 721 on the highlight dot pattern 741 in the process of Step S16 of FIG. 6A, in the first process of Step S17, a plurality of ON elements 721 which exist at the same position in the y direction as the ON element 721 where a dot has already set (i.e., the plurality of ON elements 721 included in the same element group), are excluded from objects to be added to with dots and a new dot is added to an ON element 721 (other than the plurality of ON elements 721 included in the element group) which is farthest from existing dots, on the premise of spatial repetition of the threshold matrix 710.

In the second process of Step S17, a plurality of ON elements 721 included in the same element group as that including each of the ON element 721 selected in the process of Step S16 and the ON element 721 selected in the first process of Step S17, are excluded from the objects to be added to with dots and a new dot is added to an ON element 721 which is farthest from existing dots (on the premise of spatial repetition of the threshold matrix 710). Further, in the third process of Step S17, a plurality of ON elements 721 included in the same element group as that including each of the ON element 721 selected in the process of Step S16, the ON element 721 selected in the first process of Step S17 and the ON element 721 selected in the second process, are excluded from the objects to be added to with dots and a new dot is added to an ON element 721 which is farthest from existing dots. In this manner, a new dot is added to an ON element 721 which is farthest from existing dots while excluding ON elements 721 included in the same element groups as those respectively including existing dots on the highlight dot pattern 741, from objects to be added to with dots. Therefore, when the (α−1)th process of Step S17 is finished, each element group includes one element on the highlight dot pattern 741, a dot being set at the element. Such a condition is removed from the a th process of Step S17, and a new dot is added to an ON element 721 which is farthest from existing dots.

In a general inkjet printer, if a time period where ink is not ejected from each outlet (i.e., a time period from when ejection of ink is performed to when the next ejection of ink is performed) in printing (i.e., in a state where a head is away from a home position) becomes long, there is a case where ink in the vicinities of outlets hardens to block the outlets. Especially, in a case where many pixels having gray levels on a highlight side exist in an original image, the time period where ink is not ejected tends to become longer.

On the other hand, in the above threshold matrix generation process, a condition for assigning one of numbers 1 to α in the turn-on order to one element (ON element 721) in each element group on the highlight dot pattern 741 is provided, and the process of Step S17 is repeated in accordance with the condition, to thereby determine the turn-on order in gray levels on the highlight side. As a result, in the printer 1 for printing an image on the printing paper 9 by ejecting droplets of ink from the plurality of outlets 231, it is possible to prevent the time period, where ink is not ejected from each outlet 231 in the actual printing, from becoming longer and to suppress the outlets 231 from being blocked by hardening of the ink in the vicinities of the outlets 231 in printing.

In a case where the outlets 231 are arranged in the X direction in the printer, generated is a basic element matrix 720 in which each element group, which is a group of elements arranged in the column direction at each of positions in the row direction corresponding to the arrangement direction of the outlets 231, includes at least one ON element 721 (the number of elements in the row direction is β), and a condition for assigning one of numbers 1 to β in the turn-on order to one element in each element group on the highlight dot pattern 741 is set in the process of Step S17. The condition set in the process of Step S17 may be another condition.

In a case where resolutions in the main scan direction and the sub scan direction in the printer 1 (i.e., the number of dots per unit length on the printing paper 9) are different from each other (such as a case where a resolution in the main scan direction is 720 dpi (dot per inch) and a resolution in the sub scan direction is 360 dpi), the evaluation function used in each of the process of Step S17 of FIG. 6A and that of Step S20 of FIG. 6B may be that in consideration of the difference of the resolutions. Specifically, when a resolution in the main scan direction corresponding to the x direction is ResX and a resolution in the sub scan direction corresponding to the y direction is ResY, an evaluation value $Eh_n(xh, yh)$ of each ON element 721 in the coordinates (xh, yh) of the matrix area 72 in obtaining an ON element 721 to which the dot is set in the nth setting (the nth new dot is set) in the process of Step S17 of FIG. 6A, is obtained by Eq. 4 where r is a number of the central element matrix 720 and the element matrixes 720 assumed in the 8-neighborhoods of the central element matrix 720 (see FIG. 9) and $xh_{mr}$ and $yh_{mr}$ are respectively positions in the x direction and the y direction of the mth dot in the rth element matrix 720.

$$Eh_n(xh, yh) = \sum_{m=0}^{n-1} \sum_{r=0}^{8} \frac{1}{(xh - xh_{mr})^2 / F + (yh - yh_{mr})^2 * F} \qquad \text{Eq. 4}$$

$$\text{where } F = Re\,sX / Re\,sY$$

In Eq. 4, when the resolution in the Y direction is lower than that in the X direction, the effect on an evaluation value of a distance in the y direction between each ON element 721 and an existing dot is greater than that of a distance in the x direction between the ON element 721 and the existing dot, and the greater the distances in the y direction between each ON element 721 and existing dots, a number (ordinal number) in the turn-on order of the ON element 721 tends to become smaller. When the resolution in the X direction is lower than that in the Y direction, the effect on an evaluation value of a distance in the x direction between each ON element 721 and an existing dot is greater than that of a distance in the y direction, and the greater the distances in the x direction between each ON element 721 and existing dots, a number in the turn-on order of the ON element 721 tends to become smaller. The same evaluation function is used in obtaining an OFF element 722 whose dot is removed in the nth removing in the process of Step S20 of FIG. 6B.

As discussed, when an element which is farthest from existing dots or an element which is farthest from elements where dots are not set is specified in each of the process of Step S17 of FIG. 6A and that of Step S20 of FIG. 6B, a weighting coefficient for a distance in the row direction and a weighting coefficient for a distance in the column direction are made to be different from each other in accordance with the resolutions in the main scan direction and the sub scan direction, and it is therefore possible to suppress extension of an arrangement of dots in a direction where a resolution is low in an image printed in the printer 1 and to print a preferable printed image.

Figure 22:
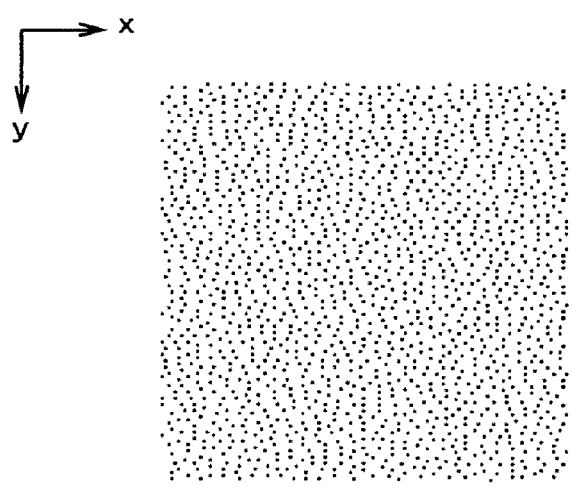
FIG. 22 is a view showing a halftone image.
Figure 23:
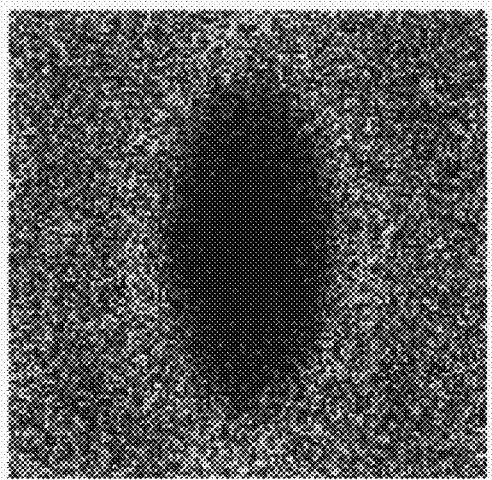
FIG. 23 is a view showing a characteristic of spatial frequency of the halftone image.

FIG. 22 is a view showing a halftone image (tint image) in a case where an original image with a uniform gray level of 10% is represented by halftoning with using the threshold matrix generated with use of the evaluation function of Eq. 4. As shown in FIG. 22, even if the original image is represented by halftoning with using the threshold matrix generated in the above process, graininess hardly appears in the halftone image. When a characteristic of spatial frequency of the halftone image in FIG. 22 is represented in a two-dimensional frequency space, the characteristic shown in FIG. 23 is acquired, and it shows that the halftone image of FIG. 22 has directional property.

Next, discussion will be made on a threshold matrix generation process in accordance with the second preferred embodiment of the present invention, pursuant to FIGS. 6A and 6B and FIG. 20.

In the element matrix acquisition part 51, first, four types of basic tiles 733, 734, 735, and 736 are prepared as shown in FIGS. 24A to 24D (FIG. 6A: Step S11). In the basic tile 733 of FIG. 24A, two elements in the upper part are the ON elements 721 and two elements in the lower part are the OFF elements 722, and in the basic tile 734 of FIG. 24B, two elements on the left side are the ON elements 721 and two elements on the right side are the OFF elements 722. In the basic tile 735 of FIG. 24C, two elements on the right side are the ON elements 721 and two elements on the left side are the OFF elements 722, and in the basic tile 736 of FIG. 24D, two elements in the lower part are the ON elements 721 and two elements in the upper part are the OFF elements 722. As described, each of the basic tiles 733 to 736 prepared in the present preferred embodiment is an arrangement in which the two ON elements 721 are arranged in the row direction or the column direction and the two OFF elements 722 are arranged in the row direction or the column direction (i.e., each diagonal component has different elements).

Figure 25:
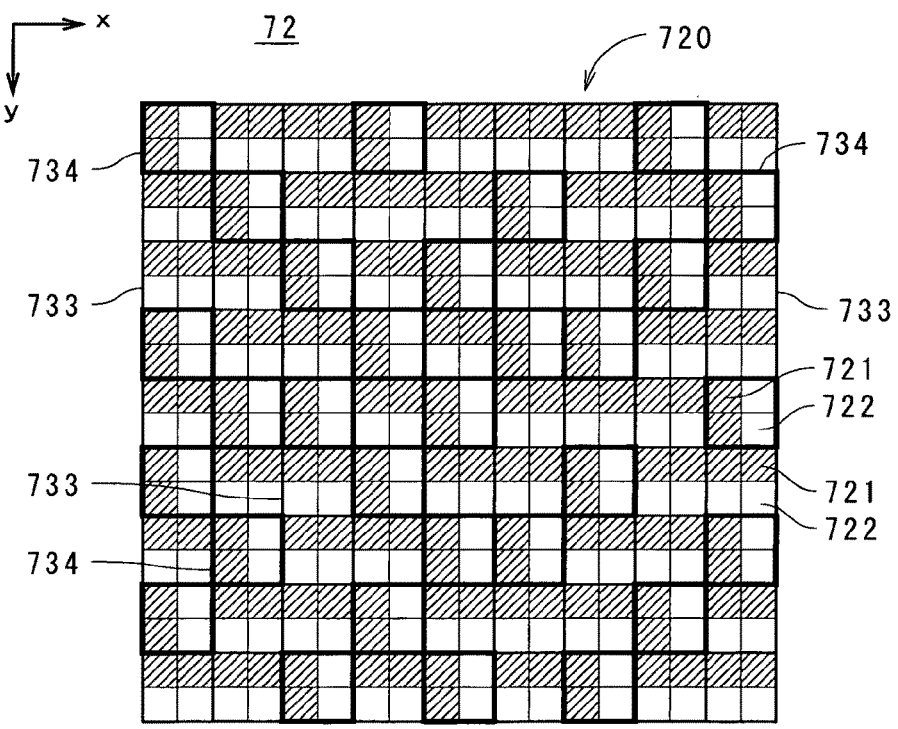
FIG. 25 is a view for explaining generation of a basic element matrix.
Figure 26A:
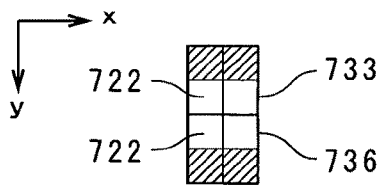
FIGS. 26A to 26F are views each showing an arrangement applying to the prohibition condition.
Figure 26B:
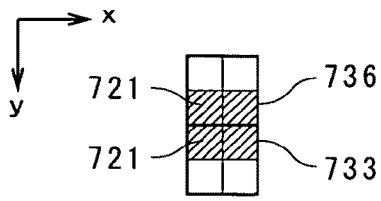
Figure 26C:
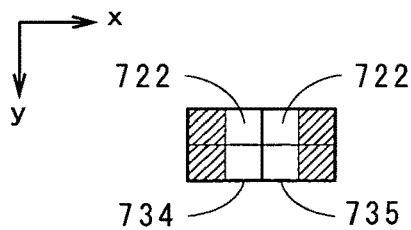
Figure 26D:
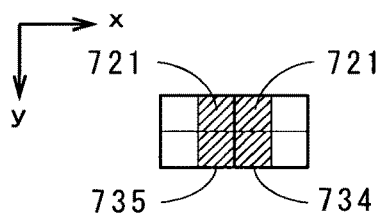
Figure 26E:
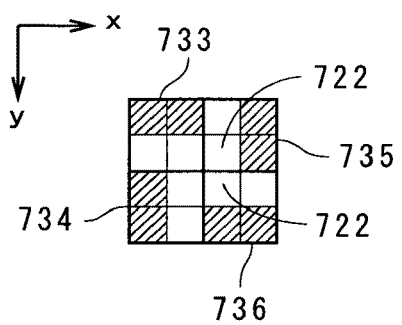
Figure 26F:
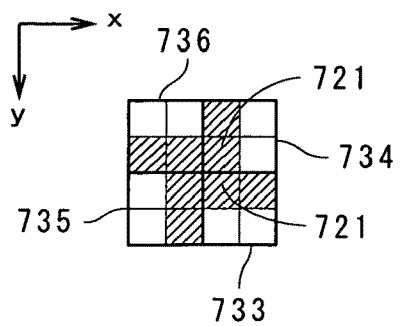

A plurality of basic tiles 733 of one type are arranged in the row direction (x direction) and the column direction (y direction) in a matrix area 72 to constitute an element matrix 720 (Step S12). After the plurality of basic tiles 733 are arranged in the matrix area 72, similarly to the first preferred embodiment, a basic tile 733 of arbitrary one tile position is replaced with a basic tile 734 of FIG. 24B (hereinafter, a basic tile which is an object to be replaced is referred to as "replacement basic tile") (Step S13) and a process of setting a new replacement basic tile 734 at a tile position which is farthest from existing replacement basic tiles 734 in accordance with the prohibition condition for prohibiting an arrangement of only the ON elements 721 or the OFF elements 722 in an area of two rows and two columns, on the premise of spatial repetition of the threshold matrix, is repeated by a predetermined number of times (The predetermined number of times is for example the number of times corresponding to 10 to 40% of the number of tile positions in the element matrix 720 and is preferably the number of times close to a value obtained by dividing the number of tile positions by the number of types of basic tiles. This is applied to later-discussed processes where basic tiles 735, 736 are replacement basic tiles.), to acquire an element matrix 720 shown in FIG. 25 (Steps S14, S15).

Actually, though it is impossible that only the ON elements 721 or the OFF elements 722 are arranged in an area of two rows and two columns when the basic tile 733 is replaced with the replacement basic tile 734, since the basic tiles 735, 736 are also set in the element matrix 720 in the later-discussed processes, there are combinations shown in FIGS. 26A to 26F where only the ON elements 721 or the OFF elements 722 are arranged in an area of two rows and two columns (i.e., the combinations are arrangements applying to the prohibition condition).

Figure 24A:
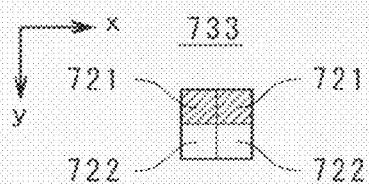
FIGS. 24A to 24D are views each showing a basic tile.
Figure 24B:
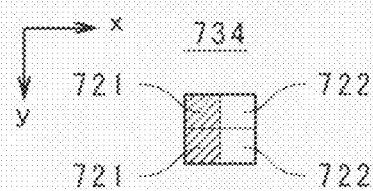
Figure 24C:
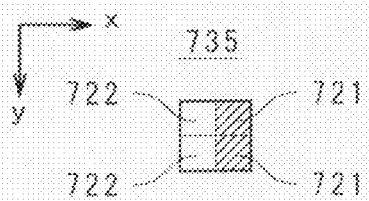
Figure 27:
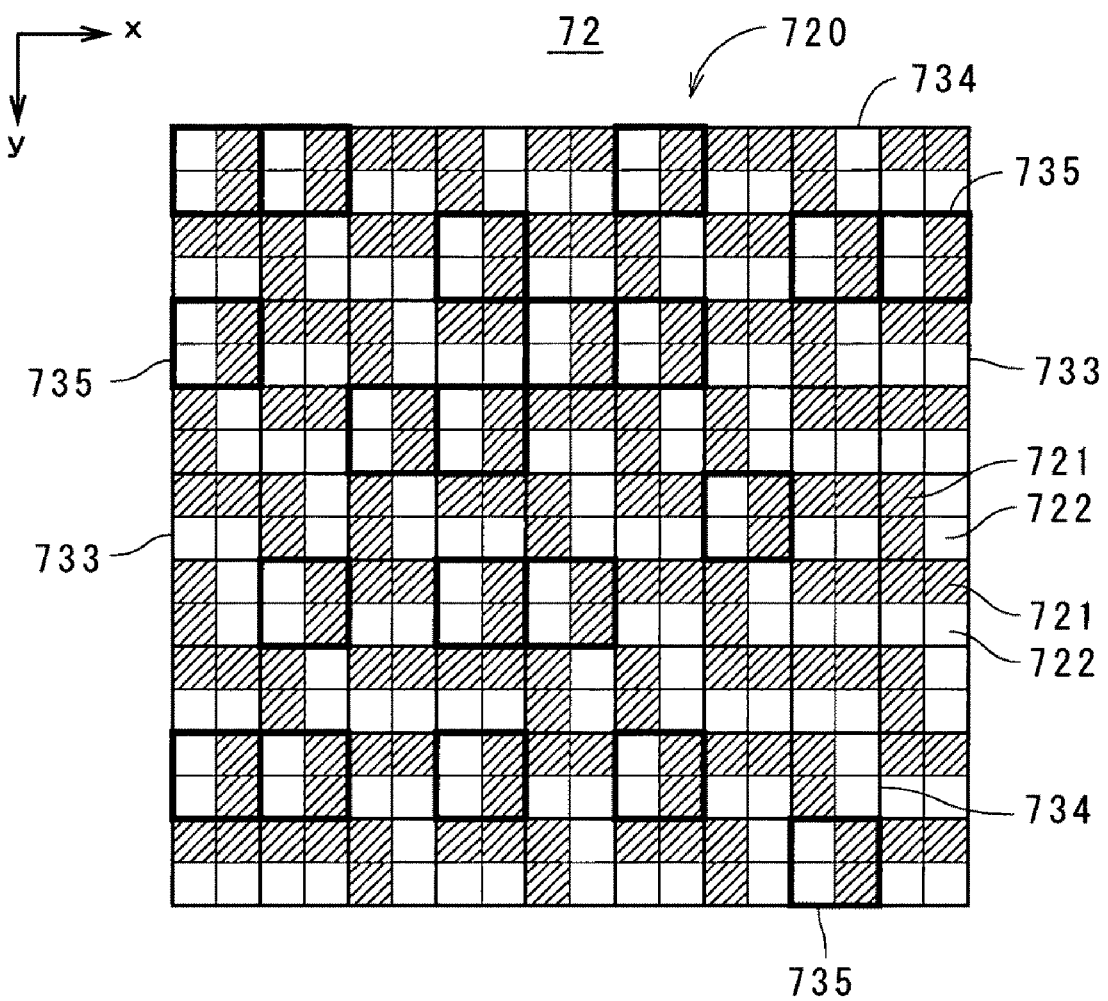
FIGS. 27 and 28 are views each for explaining generation of a basic element matrix.

Subsequently, the replacement basic tile is changed to the basic tile 735 of FIG. 24C and a basic tile of another tile position which is different from the tile position selected in Step S13 (i.e., the tile position is the initially selected tile position) is replaced with a replacement basic tile 735 (i.e., the type of the basic tile is changed to the replacement basic tile 735) (FIG. 20: Step S31). A process of setting a new replacement basic tile 735 at a tile position which is farthest from existing replacement basic tiles 735 in accordance with the prohibition condition on the premise of spatial repetition of the threshold matrix, is repeated by a predetermined number of times (i.e., a type of a basic tile which is set at a tile position farthest from basic tiles whose type has been changed, is changed to the replacement basic tile 735), to acquire an element matrix 720 shown in FIG. 27 (Steps S32, S33).

Figure 24D:
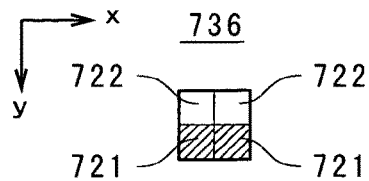
Figure 28:
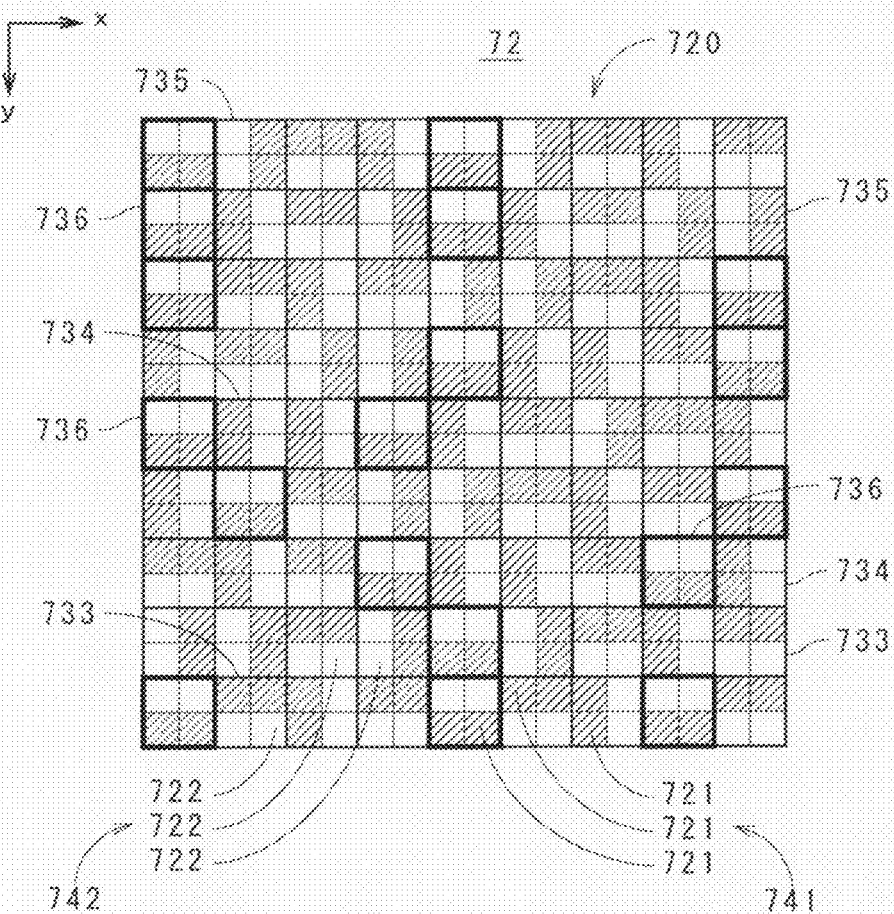

After it is confirmed the process concerning change of the basic tile is repeated (Step S34), the replacement basic tile is changed to the basic tile 736 of FIG. 24D, and a basic tile of another tile position which is different from the tile position selected in Step S13 and the tile position selected in the first Step S31, is replaced with a replacement basic tile 736 (Step S31). Then, a process of setting a new replacement basic tile 736 at a tile position which is farthest from existing replacement basic tiles 736 in accordance with the prohibition condition on the premise of spatial repetition of the threshold matrix, is repeated by a predetermined number of times, to acquire an element matrix 720 shown in FIG. 28 (Steps S32, S33).

After a final element matrix 720 (i.e., the basic element matrix 720) representing an arrangement of dots in a gray level of 50% is acquired as discussed above (Step S34), similarly to the above-discussed processes, a turn-on order in which dots are added to elements on a highlight dot pattern 741 in accordance with increase in gray level on a highlight side and a turn-off order in which dots are removed from elements on a shadow dot pattern 742 in accordance with decrease in gray level on a shadow side are determined, and then a threshold value of each element in the matrix area 72 is determined to complete a threshold matrix 710 (FIGS. 6A and 6B: Steps S16 to S22).

Figure 29:
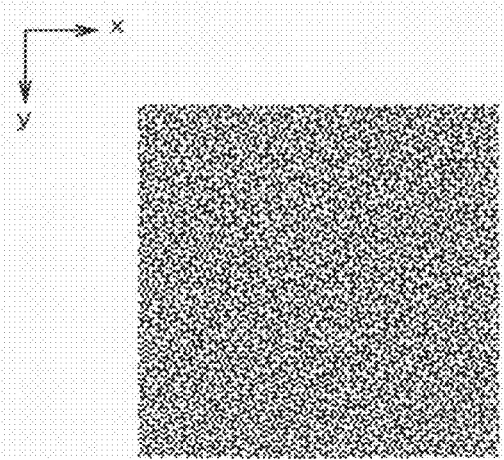
FIG. 29 is a view showing a halftone image.
Figure 30:
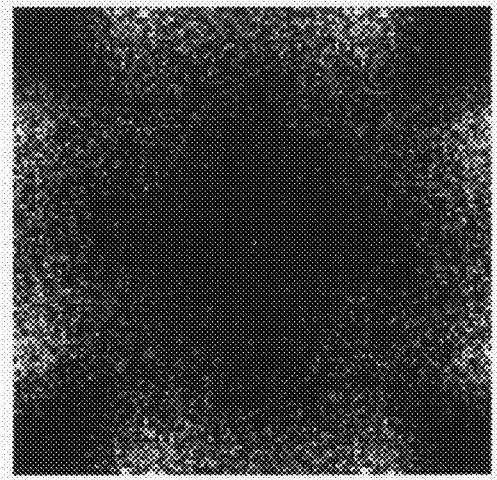
FIG. 30 is a view showing a characteristic of spatial frequency of the halftone image.

FIG. 29 is a view showing a halftone image (tint image) in a case where an original image with a uniform gray level of 50% is represented by halftoning with using the threshold matrix 710. Graininess hardly appears in the halftone image of FIG. 29. When a characteristic of spatial frequency of the halftone image in FIG. 29 is represented in a two-dimensional frequency space, the characteristic shown in FIG. 30 is acquired, and it shows that the halftone image of FIG. 29 has directional property.

Like in the first preferred embodiment, in a case where the element matrix 720 is constituted by using only the basic tiles 731, 732 in each of which the two ON elements 721 (the two OFF elements 722) are arranged diagonally, since a distance between the two ON elements 721 in each of the basic tiles 731, 732 is longer than that in the case where the ON elements 721 are arranged in the row direction or the column direction, a distance between dots in the halftone image becomes relatively longer (i.e., the sum of lengths of borders of the dots becomes greater). If the recording stability in a case that any dot is not formed around a dot in the printer 1 is low, the reproduction of the halftone image in the printed image becomes lower.

On the other hand, in a case where the element matrix 720 is constituted by using only the basic tiles 733 to 736 in each of which the two ON elements 721 (the two OFF elements 722) are arranged in the row direction or the column direction, since a distance between the two ON elements 721 in each of the basic tiles 733 to 736 is shorter than that in the basic tiles 731, 732, a distance between dots in the halftone image becomes relatively shorter. Even if the recording stability in a case that an isolated dot is formed in the printer 1 is low, it is possible to print the halftone image with high reproduction. However, when only the basic tiles 731, 732 whose each diagonal component has the same elements are used, a spatial frequency relative to each of the row direction and the column direction is high and it is therefore possible to further reduce graininess in the halftone image generated from the original image 70.

Also, the basic element matrix 720 representing an arrangement of dots in a gray level of 50% may be acquired with use of the basic tiles 731, 732 of FIGS. 7A and 7B and the basic tiles 733, 734, 735, 736 of FIGS. 24A to 24D (i.e., with use of the six types of basic tiles).

Next discussion will be made on a printer 1 in accordance with the third preferred embodiment of the present invention. Each outlet 231 of a head 21 in the printer 1 according to the present preferred embodiment can form a plurality of dots having different sizes on a printing paper 9 by ejecting different amounts of droplets, and a dot of S size which is the smallest one, a dot of M size which is larger than S size, and a dot of L size which is larger than M size can be formed in the present operation example.

Each threshold value of a threshold matrix used in the actual printing in the printer 1 according to the third preferred embodiment is a set of a sub-threshold value used for determining necessity of formation of a dot with S size, a sub-threshold value used for determining necessity of formation of a dot with M size, and a sub-threshold value used for determining necessity of formation of a dot with L size. The threshold matrix is divided into a sub-threshold matrix which is a two-dimensional array of the sub-threshold values for S size, a sub-threshold matrix which is a two-dimensional array of the sub-threshold values for M size, and a sub-threshold matrix which is a two-dimensional array of the sub-threshold values for L size, and these sub-threshold matrixes are stored in the matrix memory 42 of FIG. 4. Out of the mutually corresponding sub-threshold values in the sub-threshold matrixes, the smallest value is in the sub-threshold matrix for S size and the largest value is in the sub-threshold matrix for L size. The sub-threshold matrix will be described later.

In generation of a halftone image for each color component in the printer 1, first, a pixel value of each pixel in the original image is compared with a sub-threshold value of the sub-threshold matrix for S size corresponding to the pixel value. Comparison of the pixels in the original image is actually performed one by one, however conceptually, in the original image, pixels at the positions where the pixel values are larger than the corresponding sub-threshold values of the sub-threshold matrix for S size, for example, are assigned the pixel values "1" and the remaining pixels are assigned the pixel values "0", to generate a provisional outputted image. Subsequently, the pixel value of each pixel in the original image is compared with the corresponding sub-threshold value of the sub-threshold matrix for M size, and pixels in the outputted image at the positions where the pixel values are larger than the corresponding sub-threshold values of the sub-threshold matrix are changed to the pixel values "2" and the remaining pixels keep the pixel values as is, to modify the provisional outputted image. Then, the pixel value of each pixel in the original image is compared with the corresponding sub-threshold value of the sub-threshold matrix for L size, and pixels in the outputted image at the positions where the pixel values are larger than the corresponding sub-threshold values of the sub-threshold matrix are changed to the pixel values "3" and the remaining pixels keep the pixel values as is, to acquire a quaternary outputted image, which is comparison results between the pixel values of the original image and the corresponding threshold values of the threshold matrix, as a halftone image. As discussed later, since the pixel values "1", "2" and "3" in the outputted image indicate the size of dot which is formed on the printing paper 9 by the corresponding outlet 231, the halftone image is substantially a halftone image represented by the absence or presence of dot (and size of dot).

As discussed earlier, out of the corresponding sub-threshold values in the threshold matrix, the smallest one is in the sub-threshold matrix for S size and the largest one is in the sub-threshold matrix for L size. Thus, in comparison between the original image and the sub-threshold matrix for S size, when a pixel value of a pixel in the original image is equal to or smaller than the corresponding sub-threshold value of the sub-threshold matrix, the pixel value is always equal to or smaller than the corresponding sub-threshold values of the sub-threshold matrix for M size and the sub-threshold matrix for L size. When a pixel value of a pixel in the original image is equal to or smaller than the corresponding sub-threshold value of the sub-threshold matrix for M size, the pixel value is always equal to or smaller than the corresponding sub-threshold value of the sub-threshold matrix for L size. Comparing such pixel values of pixels in the original image with the corresponding sub-threshold values of the sub-threshold matrixes for M and L sizes may be omitted.

In the printer 1, with respect to each color component, the process of printing generated parts of the halftone images is performed while generating the halftone image as discussed above. In printing the halftone image, in synchronization with relative movement of the head 21 to the printing paper 9, in the ejection controller 44, when a pixel value in the halftone image corresponding to an ejection position of each outlet 231 on the printing paper 9 is "1", a dot of S size is formed on the ejection position, and when the pixel value in the halftone image is "2", a dot of M size is formed on the ejection position. Also, when the pixel value in the halftone image is "3", a dot of L size is formed on the ejection position, and when the pixel value in the halftone image is "0", a dot is not formed on the ejection position. In this way, in synchronization with the relative movement of the head 21 to the printing paper 9 (scanning of the plurality of ejection positions on the printing paper 9 associated with the plurality of outlets 231, respectively), ejection of ink from the plurality of outlets 231 is controlled in accordance with comparison results between the pixel values of the original image at the ejection positions of the plurality of outlets 231 relative to the printing paper 9 and the threshold values of the threshold matrix corresponding to the pixel values, to print a color halftone image on the printing paper 9.

Figure 31:
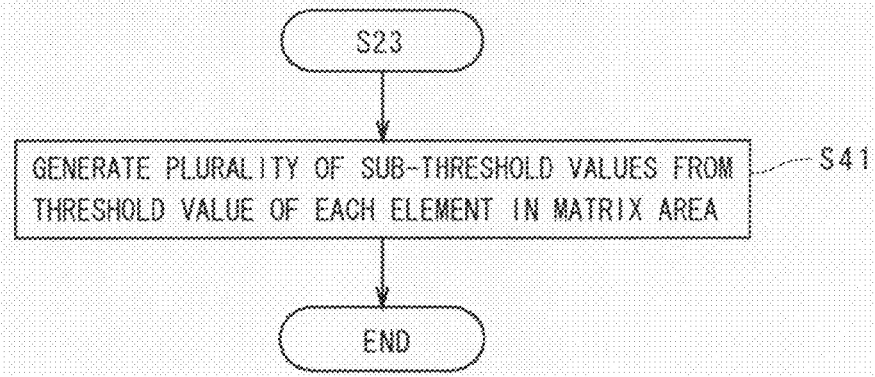
FIG. 31 is a flowchart showing a part of a process flow for generating a threshold matrix.

FIG. 31 is a flowchart showing a part of generation process of a threshold matrix and shows a process which is performed after Step S23 of FIG. 6B. Following discussion will be made on a technique of generating the sub-threshold matrixes for one color component. The sub-threshold matrixes for the other color components are generated in the same manner.

In the threshold value determining part 54, in the matrix area 72 where a threshold value is assigned to each element by performing the processes of Steps S11 to S23 of FIGS. 6A and 6B (naturally, the matrix area 72 may be one in which Steps S31 to S34 of FIG. 20 are performed), a matrix where a quotient obtained by dividing a threshold value of each element by 2 is used as a new value (i.e., sub-threshold value) of the element is generated as a sub-threshold matrix for formation of dot with S size. In the sub-threshold matrix for formation of dot with S size, a value of each element is one of 0 to 127. The value 64 which is 25% of 256 gray levels in the original image is added to the value of each element of the sub-threshold matrix for formation of dot with S size to generate a sub-threshold matrix for formation of dot with M size, and the value 128 which is 50% of 256 gray levels in the original image is added to the value of each element of the sub-threshold matrix for formation of dot with S size to generate a sub-threshold matrix for formation of dot with L size. A value of each element in the sub-threshold matrix for formation of dot with M size is one of 64 to 191 and a value of each element in the sub-threshold matrix for formation of dot with L size is one of 128 to 255. In this way, a threshold value of each element in the matrix area 72 is converted to thereby generate a plurality of sub-threshold values which are respectively included in the sub-threshold matrix for formation of dot with S size, the sub-threshold matrix for formation of dot with M size, and the sub-threshold matrix for formation of dot with L size (Step S41).

Figure 32:
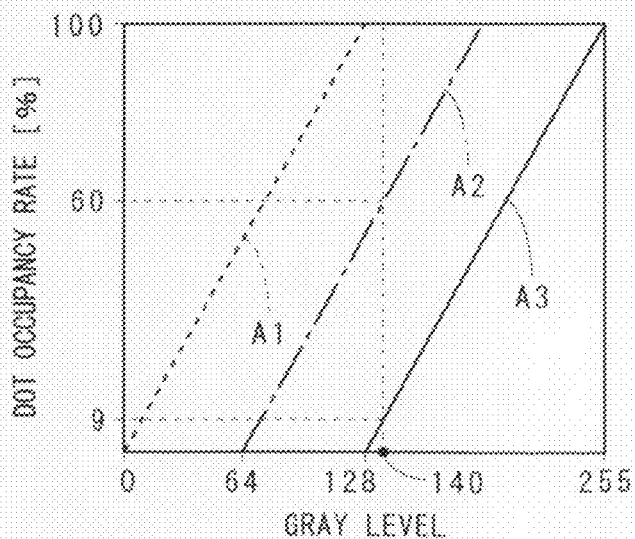
FIG. 32 is a graph for explaining characteristics of sub-threshold matrixes.

Here, discussion will be made on the characteristics of the sub-threshold matrixes. FIG. 32 is a graph for explaining the characteristics of the sub-threshold matrixes. In FIG. 32, the vertical axis shows a proportion of the number of dots with each size formed on the printing paper 9 relative to the number of all pixels, in a case where an image with a uniform gray level is printed with use of only the sub-threshold matrix for that size in the printer 1 (hereinafter, the proportion is referred to as "dot occupancy rate"), and the horizontal axis shows a gray level of the image in this case. In FIG. 32, a broken line A1 is a dot occupancy rate in the case of only using the sub-threshold matrix for S size, a one-dot chain line A2 is that in the case of only using the sub-threshold matrix for M size, and a solid line A3 is that in the case of only using the sub-threshold matrix for L size.

As shown in FIG. 32, in the case of only the sub-threshold matrix for S size, the dot occupancy rate linearly increases from 0 to 100% as the gray level of the image increases from 0 to 128, and the dot occupancy rate keeps 100% at a gray level of 128 or more. In the case of only the sub-threshold matrix for M size, the dot occupancy rate is 0% at a gray level of the image which is equal to or smaller than 64, it linearly increases from 0 to 100% as the gray level increases from 64 to 192, and it keeps 100% at a gray level of 192 or more. In the case of only the sub-threshold matrix for L size, the dot occupancy rate is 0% at a gray level of the image which is equal to or smaller than 128, and it linearly increases from 0 to approximately 100% as the gray level increases from 128 to 255.

For example, looking at a gray level of 140, the dot occupancy rate in the sub-threshold matrix for L size is 9%, that in the sub-threshold matrix for M size is 60%, and that in the sub-threshold matrix for S size is 100%, as shown in FIG. 32. As discussed above, the dots with the different sizes are not formed on the same position in the actual printing and the dot with larger size is formed on a preferential basis. In the sub-threshold matrixes for S, M, and L sizes, out of the values (the sub-threshold values) in the same position, the largest one is in the sub-threshold matrix for L size and the smallest one is in the sub-threshold matrix for S size. Under the above-discussed assumption that the image with the uniform gray level is printed with use of only the sub-threshold matrix for each size (i.e., an image formed only by dots with S size, an image formed only by dots with M size, and an image formed only by dots with L size are printed), in a gray level, a dot is certainly formed in the same position in each of the image formed only by dots with S size and the image formed only by dots with M size, as a position of dot in the image formed only by dots with L size, and a dot is certainly formed in the same position in the image formed only by dots with S size, as a position of dot in the image formed only by dots with M size.

Therefore, if an image with a uniform gray level of 140 is printed with use of a set of the sub-threshold matrixes in the printer 1, the dot occupancy rate of L size is 9%, that of M size is 51% (which is calculated by (60−9)), and that of S size is 40% (which is calculated by (100−60)). Since the original image actually has a tone (i.e., portions of various gray levels) and each pixel value is compared with the sub-threshold values in the corresponding position of the sub-threshold matrixes, dots with S, M, and L size are stochastically formed in printing in accordance with the graph of FIG. 32 by using the threshold matrix where each threshold value is a set of the sub-threshold values.

As discussed above, in generation process of the threshold matrix according to the present preferred embodiment, the plurality of sub-threshold values used for determination of size of a dot are generated from the threshold value of each element in the matrix area 72 where the threshold values are assigned by the processes of Steps S11 to S23 of FIGS. 6A and 6B. It is therefore possible to reduce graininess in the image printed in the printer 1 which is capable of forming dots having different sizes.

Though the preferred embodiments of the present invention have been discussed above, the present invention is not limited to the above-discussed preferred embodiments, but allows various variations.

Though a plurality of basic tiles of one type are first arranged in the matrix area 72 to constitute an element matrix in the above preferred embodiments, a replacement basic tile is set at one arbitrary tile position in the matrix area 72, the process of setting a new replacement basic tile at a tile position which is farthest from existing replacement basic tiles in accordance with the prohibition condition for prohibiting an arrangement of only the ON elements 721 or the OFF elements 722 in an area of two rows and two columns, on the premise of spatial repetition of the threshold matrix, may be repeated. In this case, basic tiles of another type are set at tile positions in the matrix area 72 where the basic tiles are not set, to constitute an element matrix.

In the process of Step S13 of FIG. 6A, one tile position which is replaced with the replacement basic tile (i.e., one tile position where the replacement basic tile is set) is selected, however, some tile positions can be selected as one arbitrary tile position and in this case, one arbitrary tile position is considered as at least one tile position (the same as in the process of Step S31 of FIG. 20). Similarly, in each process of Step S16 of FIG. 6A and Step S19 of FIG. 6B, several elements can be selected as one arbitrary element and one arbitrary element is considered as at least one element.

Although a sum of the reciprocals of square values of distances between existing replacement basic tiles and each tile position in the element matrix is obtained on the premise of spatial repetition of the threshold matrix in the element matrix acquisition part 51 to thereby specify a tile position which is farthest from existing replacement basic tiles, for example, there may be a case where a distance between each tile position in the element matrix and its nearest replacement basic tile is obtained and a tile position where the distance is maximum is specified as a tile position which is farthest from existing replacement basic tiles. That is to say, a tile position which is farthest from existing replacement basic tiles can be specified by various techniques.

Also in the turn-on order determining part 52, a distance between each element on the highlight dot pattern 741 and its nearest dot is obtained and an element where the distance is maximum may be specified as an element which is farthest from existing dots (the same as in the turn-off order determining part 53).

Figure 33A:
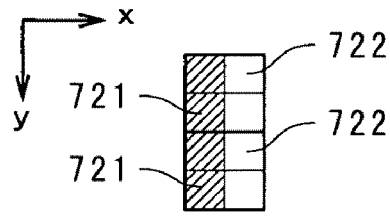
FIGS. 33A to 33D are views each showing another example of an arrangement applying to a prohibition condition.
Figure 33B:
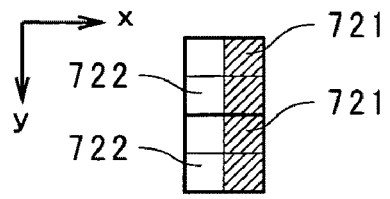
Figure 33C:
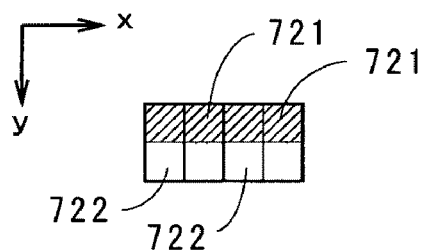
Figure 33D:
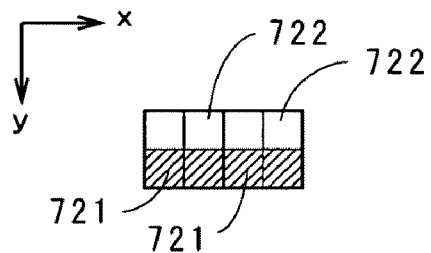

In the second preferred embodiment, a prohibition condition for prohibiting an arrangement of only the ON elements 721 or the OFF elements 722 in an area of four rows and one column as shown in FIGS. 33A and 33B or a prohibition condition for prohibiting an arrangement of only the ON elements 721 or the OFF elements 722 in an area of one row and four columns as shown in FIGS. 33C and 33D may be used. However, in order to reduce graininess in the halftone image, the prohibition condition for at least prohibiting an arrangement of only the ON elements 721 or the OFF elements 722 in an area of two rows and two columns is required.

The threshold matrix generated by the present technique can be used for other image recording apparatuses for recording a halftone image, which is generated by halftoning the original image, on an object, such as an electrophotographic printer or a plate-making apparatus for CTP (Computer To Plate), as well as the inkjet printer 1.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2007-30180 filed in the Japan Patent Office on Feb. 9, 2007, the entire disclosure of which is incorporated herein by reference.

What is claimed is:

1. A threshold matrix generation method of generating a threshold matrix which is compared with a grayscale original image in halftoning said original image, comprising the steps of:
   a) preparing a plurality of types of basic tiles each of which is an arrangement of elements in two rows and two columns consisting of two ON elements each representing existence of a dot and two OFF elements each representing absence of a dot, and arranging a plurality of basic tiles each of which is one of said plurality of types of basic tiles, in a matrix area where a threshold matrix is generated, in accordance with a prohibition condition for at least prohibiting an arrangement of only ON elements or OFF elements in an area of two rows and two columns, to acquire an element matrix representing an arrangement of dots in a gray level of 50%;
   b) setting a dot at arbitrary one element on a highlight dot pattern which is a set of ON elements in said element matrix;
   c) repeating a process of adding a new dot to an element on said highlight dot pattern, said new dot being farthest from existing dots on said highlight dot pattern, on the premise of spatial repetition of said threshold matrix in halftoning of an original image, or repeating a process of adding a new dot to an element on said highlight dot pattern, said new dot being farthest in a predetermined condition from existing dots on said highlight dot pattern, on the premise of spatial repetition of said threshold matrix in halftoning of an original image, to determine a turn-on order in which dots are added to elements in accordance with increase in gray level on a highlight side;
   d) setting dots at all elements excluding arbitrary one element on a shadow dot pattern which is a set of OFF elements in said element matrix;
   e) repeating a process of removing a dot of an element on said shadow dot pattern, said dot being farthest from elements in each of which a dot is not set on said shadow dot pattern, on the premise of spatial repetition of said threshold matrix, to determine a turn-off order in which dots are removed from elements in accordance with decrease in gray level on a shadow side; and
   f) determining a threshold value of each element in said matrix area in accordance with said turn-on order and said turn-off order; wherein
   said steps a) to f) are performed by a computer comprising a processor.

2. The threshold matrix generation method according to claim 1, wherein
said plurality of types of basic tiles are two types of arrangements in each of which said two ON elements are arranged diagonally.

3. The threshold matrix generation method according to claim 1, wherein
said two ON elements are arranged in a row direction or a column direction in each of said plurality of types of basic tiles.

4. The threshold matrix generation method according to claim 1, wherein
said step a) comprises the steps of:
a1) setting a basic tile of one type at arbitrary one tile position in said matrix area;
a2) setting a new basic tile of said one type at a tile position which is farthest from basic tiles of said one type in accordance with said prohibition condition, on the premise of spatial repetition of said threshold matrix; and
a3) repeating said step a2) by a predetermined number of times.

5. The threshold matrix generation method according to claim 4, wherein
said step a) further comprises the steps of:
a4) changing a type of a basic tile which is set at one tile position different from said arbitrary one tile position in said matrix area where said plurality of basic tiles are arranged, after said step a3);
a5) changing a type of a basic tile which is set at a tile position farthest from basic tiles whose type has been changed, in accordance with said prohibition condition on the premise of spatial repetition of said threshold matrix; and
a6) repeating said step a5) by a predetermined number of times.

6. The threshold matrix generation method according to claim 4, wherein
the number of elements in at least one of a row direction and a column direction in said element matrix is a value which is different from a power of two.

7. The threshold matrix generation method according to claim 1, wherein
said matrix area corresponds to one color component, and
said steps a) to f) are performed in a matrix area of another color component which is different from said matrix area of said one color component, to generate a threshold matrix of said another color component which has a different size from a threshold matrix of said one color component.

8. The threshold matrix generation method according to claim 1, wherein
resolutions in two directions which respectively corresponds to a row direction and a column direction in said matrix area, are different from each other in an image recording apparatus for recording a halftone image, which is generated by halftoning said original image, on an object, and
a weighting coefficient for a distance in said row direction and a weighting coefficient for a distance in said column direction are different from each other in accordance with said resolutions in said two directions, when an element which is farthest from existing dots or an element which is farthest from elements where dots are not set is specified in each of said steps c) and e).

9. The threshold matrix generation method according to claim 1, wherein
a plurality of dots having different sizes can be formed on an object in an image recording apparatus for recording a halftone image, which is generated by halftoning said original image, on said object, and
said threshold matrix generation method further comprises the step of
generating a plurality of sub-threshold values used for determination of size of a dot from said threshold value of said each element in said matrix area.

10. The threshold matrix generation method according to claim 1, wherein
a halftone image generated by halftoning said original image is recorded on an object by ejecting fine droplets of ink from a plurality of outlets arranged in a predetermined arrangement direction, in an image recording apparatus for recording said halftone image on said object,
each element group which is a group of elements arranged in one direction out of a row direction and a column direction in said element matrix includes at least one ON element and the other direction corresponds to said arrangement direction of said plurality of outlets, and
said predetermined condition in said step c) is that one of numbers 1 to α in said turn-on order is assigned to one element in said each element group in said element matrix where the number of elements in said other direction in said element matrix is α.

11. A threshold matrix generating apparatus for generating a threshold matrix which is compared with a grayscale original image in halftoning said original image, comprising:
an element matrix acquisition part for preparing a plurality of types of basic tiles each of which is an arrangement of elements in two rows and two columns consisting of two ON elements each representing existence of a dot and two OFF elements each representing absence of a dot, and arranging a plurality of basic tiles each of which is one of said plurality of types of basic tiles, in a matrix area where a threshold matrix is generated, in accordance with a prohibition condition for at least prohibiting an arrangement of only ON elements or OFF elements in an area of two rows and two columns, to acquire an element matrix representing an arrangement of dots in a gray level of 50%;
a turn-on order determining part for setting a dot at arbitrary one element on a highlight dot pattern which is a set of ON elements in said element matrix and thereafter, repeating a process of adding a new dot to an element on said highlight dot pattern, said new dot being farthest from existing dots on said highlight dot pattern, on the premise of spatial repetition of said threshold matrix in halftoning of an original image, or repeating a process of adding a new dot to an element on said highlight dot pattern, said new dot being farthest in a predetermined condition from existing dots on said highlight dot pattern, on the premise of spatial repetition of said threshold matrix in halftoning of an original image, to determine a turn-on order in which dots are added to elements in accordance with increase in gray level on a highlight side;
a turn-off order determining part for setting dots at all elements excluding arbitrary one element on a shadow dot pattern which is a set of OFF elements in said element matrix and thereafter, repeating a process of removing a dot of an element on said shadow dot pattern, said dot being farthest from elements in each of which a dot is not set on said shadow dot pattern, on the premise of spatial repetition of said threshold matrix, to determine a turn-off order in which dots are removed from elements in accordance with decrease in gray level on a shadow side; and a threshold value determining part for determining a threshold value of each element in said matrix area in accordance with said turn-on order and said turn-off order; wherein said element matrix acquisition part, said turn-on order determining part, said turn-off order determining part and said threshold value determining part are implemented by a computer comprising a processor.

12. The threshold matrix generating apparatus according to claim 11, wherein said plurality of types of basic tiles are two types of arrangements in each of which said two ON elements are arranged diagonally.

13. The threshold matrix generating apparatus according to claim 11, wherein said two ON elements are arranged in a row direction or a column direction in each of said plurality of types of basic tiles.

14. The threshold matrix generating apparatus according to claim 11, wherein said element matrix acquisition part executes the steps of:

a1) setting a basic tile of one type at arbitrary one tile position in said matrix area;

a2) setting a new basic tile of said one type at a tile position which is farthest from basic tiles of said one type in accordance with said prohibition condition, on the premise of spatial repetition of said threshold matrix; and a3) repeating said step a2) by a predetermined number of times.

15. The threshold matrix generating apparatus according to claim 14, wherein said element matrix acquisition part further executes the steps of:

a4) changing a type of a basic tile which is set at one tile position different from said arbitrary one tile position in said matrix area where said plurality of basic tiles are arranged, after said step a3);

a5) changing a type of a basic tile which is set at a tile position farthest from basic tiles whose type has been changed, in accordance with said prohibition condition on the premise of spatial repetition of said threshold matrix; and a6) repeating said step a5) by a predetermined number of times.

16. The threshold matrix generating apparatus according to claim 14, wherein the number of elements in at least one of a row direction and a column direction in said element matrix is a value which is different from a power of two.

17. The threshold matrix generating apparatus according to claim 11, wherein said matrix area corresponds to one color component, and said element matrix acquisition part, said turn-on order determining part, said turn-off order determining part, and said threshold value determining part generate a threshold matrix of another color component which has a different size from a threshold matrix of said one color component, in a matrix area of said another color component which is different from said matrix area of said one color component.

18. The threshold matrix generating apparatus according to claim 11, wherein resolutions in two directions which respectively corresponds to a row direction and a column direction in said matrix area, are different from each other in an image recording apparatus for recording a halftone image, which is generated by halftoning said original image, on an object, and a weighting coefficient for a distance in said row direction and a weighting coefficient for a distance in said column direction are different from each other in accordance with said resolutions in said two directions, when an element which is farthest from existing dots or an element which is farthest from elements where dots are not set is specified in each of said turn-on order determining part and said turn-off order determining part.

19. The threshold matrix generating apparatus according to claim 11, wherein a plurality of dots having different sizes can be formed on an object in an image recording apparatus for recording a halftone image, which is generated by halftoning said original image, on said object, and said threshold value determining part generates a plurality of sub-threshold values used for determination of size of a dot from said threshold value of said each element in said matrix area.

20. The threshold matrix generating apparatus according to claim 11, wherein a halftone image generated by halftoning said original image is recorded on an object by ejecting fine droplets of ink from a plurality of outlets arranged in a predetermined arrangement direction, in an image recording apparatus for recording said halftone image on said object, each element group which is a group of elements arranged in one direction out of a row direction and a column direction in said element matrix includes at least one ON element and the other direction corresponds to said arrangement direction of said plurality of outlets, and said predetermined condition in said turn-on order determining part is that one of numbers 1 to α in said turn-on order is assigned to one element in said each element group in said element matrix where the number of elements in said other direction in said element matrix is α.

21. An electronic apparatus-readable recording medium which is non-transitory and in which data of a threshold matrix is recorded, said threshold matrix being compared with a grayscale original image in halftoning said original image, said data being generated by executing steps including the steps of:

a) preparing a plurality of types of basic tiles each of which is an arrangement of elements in two rows and two columns consisting of two ON elements each representing existence of a dot and two OFF elements each representing absence of a dot, and arranging a plurality of basic tiles each of which is one of said plurality of types of basic tiles, in a matrix area where a threshold matrix is generated, in accordance with a prohibition condition for at least prohibiting an arrangement of only ON elements or OFF elements in an area of two rows and two columns, to acquire an element matrix representing an arrangement of dots in a gray level of 50%;

b) setting a dot at arbitrary one element on a highlight dot pattern which is a set of ON elements in said element matrix;

c) repeating a process of adding a new dot to an element on said highlight dot pattern, said new dot being farthest from existing dots on said highlight dot pattern, on the premise of spatial repetition of said threshold matrix in halftoning of an original image, or repeating a process of adding a new dot to an element on said highlight dot pattern, said new dot being farthest in a predetermined condition from existing dots on said highlight dot pattern, on the premise of spatial repetition of said threshold matrix in halftoning of an original image, to determine a turn-on order in which dots are added to elements in accordance with increase in gray level on a highlight side;

d) setting dots at all elements excluding arbitrary one element on a shadow dot pattern which is a set of OFF elements in said element matrix;

e) repeating a process of removing a dot of an element on said shadow dot pattern, said dot being farthest from elements in each of which a dot is not set on said shadow dot pattern, on the premise of spatial repetition of said threshold matrix, to determine a turn-off order in which dots are removed from elements in accordance with decrease in gray level on a shadow side; and f) determining a threshold value of each element in said matrix area in accordance with said turn-on order and said turn-off order.

22. The recording medium according to claim 21, wherein said plurality of types of basic tiles are two types of arrangements in each of which said two ON elements are arranged diagonally.

23. The recording medium according to claim 21, wherein said two ON elements are arranged in a row direction or a column direction in each of said plurality of types of basic tiles.

24. The recording medium according to claim 21, wherein said step a) comprises the steps of:

a1) setting a basic tile of one type at arbitrary one tile position in said matrix area;

a2) setting a new basic tile of said one type at a tile position which is farthest from basic tiles of said one type in accordance with said prohibition condition, on the premise of spatial repetition of said threshold matrix; and a3) repeating said step a2) by a predetermined number of times.

25. The recording medium according to claim 24, wherein said step a) further comprises the steps of:

a4) changing a type of a basic tile which is set at one tile position different from said arbitrary one tile position in said matrix area where said plurality of basic tiles are arranged, after said step a3);

a5) changing a type of a basic tile which is set at a tile position farthest from basic tiles whose type has been changed, in accordance with said prohibition condition on the premise of spatial repetition of said threshold matrix; and a6) repeating said step a5) by a predetermined number of times.

26. The recording medium according to claim 24, wherein the number of elements in at least one of a row direction and a column direction in said element matrix is a value which is different from a power of two.

27. The recording medium according to claim 21, wherein said matrix area corresponds to one color component, and data of a threshold matrix of another color component which has a different size from a threshold matrix of said one color component is further recorded on said recording medium, said threshold matrix of said another color component being generated by performing said steps a) to f) in a matrix area of said another color component which is different from said matrix area of said one color component.

28. The recording medium according to claim 21, wherein resolutions in two directions which respectively corresponds to a row direction and a column direction in said matrix area, are different from each other in an image recording apparatus for recording a halftone image, which is generated by halftoning said original image, on an object, and a weighting coefficient for a distance in said row direction and a weighting coefficient for a distance in said column direction are different from each other in accordance with said resolutions in said two directions, when an element which is farthest from existing dots or an element which is farthest from elements where dots are not set is specified in each of said steps c) and e).

29. The recording medium according to claim 21, wherein a plurality of dots having different sizes can be formed on an object in an image recording apparatus for recording a halftone image, which is generated by halftoning said original image, on said object, and a step of generating a plurality of sub-threshold values used for determination of size of a dot from said threshold value of said each element in said matrix area, is further performed in generation of said data.

30. The recording medium according to claim 21, wherein a halftone image generated by halftoning said original image is recorded on an object by ejecting fine droplets of ink from a plurality of outlets arranged in a predetermined arrangement direction, in an image recording apparatus for recording said halftone image on said object, each element group which is a group of elements arranged in one direction out of a row direction and a column direction in said element matrix includes at least one ON element and the other direction corresponds to said arrangement direction of said plurality of outlets, and said predetermined condition in said step c) is that one of numbers 1 to $\alpha$ in said turn-on order is assigned to one element in said each element group in said element matrix where the number of elements in said other direction in said element matrix is $\alpha$.

* * * * *